US008061599B2

(12) United States Patent
Daly et al.

(10) Patent No.: US 8,061,599 B2
(45) Date of Patent: Nov. 22, 2011

(54) STRUCTURAL SYSTEM FOR OPTIMIZING PERFORMANCE OF A MILLIMETER WAVE CONCEALED OBJECT DETECTION SYSTEM

(75) Inventors: Robert Patrick Daly, Orlando, FL (US); Willem H. Reinpoldt, Windermere, FL (US); Michael F. Strong, Clermont, FL (US); Jonathon Y. Tarr, Sanford, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 827 days.

(21) Appl. No.: 12/136,000

(22) Filed: Jun. 9, 2008

(65) Prior Publication Data

US 2008/0303708 A1    Dec. 11, 2008

Related U.S. Application Data

(60) Provisional application No. 60/942,469, filed on Jun. 7, 2007, provisional application No. 60/942,467, filed on Jun. 7, 2007.

(51) Int. Cl.
*G06K 5/00* (2006.01)

(52) U.S. Cl. .......................................... 235/382; 235/22
(58) Field of Classification Search .................. 235/22, 235/175, 180, 181, 26 R, 26 A, 26 B, 25 A–25 E, 235/27, 29, 89, 90, 176, 195, 197, 179, 182, 235/183, 382, 382.5
See application file for complete search history.

(56) References Cited

U.S. PATENT DOCUMENTS

2004/0190757 A1 *  9/2004  Murphy et al. ................ 382/115
* cited by examiner

*Primary Examiner* — Karl D. Frech
(74) *Attorney, Agent, or Firm* — Matthew G. McKinney

(57) ABSTRACT

A structural system for optimizing the performance of a millimeter wave concealed object detection system is disclosed. In a particular embodiment, a shell is provided to house and protect the millimeter wave concealed object detection system so that the detection system can operate optimally in a controlled and managed environment by eliminating or mitigating spurious millimeter wave emissions or reflections from outside or inside the shell. The shell can be free-standing or attached to a parent structure. The entry and exit to the system is controlled by entry and exit barriers. In addition, an inspection lane is configured according to each particular application to guide a subject through the detection system.

20 Claims, 11 Drawing Sheets

STRUCTURAL SYSTEM FOR OPTIMIZING PERFORMANCE OF A MILLIMETER WAVE CONCEALED OBJECT DETECTION SYSTEM

I. CROSS REFERENCE TO RELATED APPLICATIONS

This application claims the benefit of U.S. Provisional Application No. 60/942,469, filed Jun. 7, 2007, and U.S. Provisional Application No. 60/942,467, filed Jun. 7, 2007. The disclosures of the provisional applications are incorporated herein by reference.

II. FIELD

The present disclosure relates in general to the field of concealed object detection, and in particular to a structural system for optimizing performance of a millimeter wave concealed object detection system.

III. DESCRIPTION OF RELATED ART

Security systems can be found at airports, train stations, arenas, construction sites, and other public, private, commercial and industrial facilities. In addition, security systems are used in field military operations to secure boundaries. One of the principal concerns of operators of security systems is the need to protect security personnel and innocent bystanders in the course of conducting a search of a person for concealed objects. The concealed objects that present a danger are weapons, explosives, contraband and other similar items that may endanger security personnel and other individuals in the proximity.

Typical metal or chemical residue detectors require security personnel to be in the proximity of the individual. For example, one or more security personnel are required to conduct a hands-on or "wand-based" scan of an individual for whom the metal or chemical residue detector has generated an alarm. An inherent deficiency of this type of security system is the fact that it exposes not only the security personnel to danger, but also other individuals in the vicinity of the security system to the dangers posed by such concealed objects. Passive millimeter wave concealed object detection systems have been developed that allow for a buffer zone between the individual and innocent bystanders. However, there is still a concern that when a concealed object is detected on a person, that the person may attempt to escape the area or injure others in the proximity using an explosive device (i.e., suicide bomber). Accordingly, there is a need in the relevant art for a structural system for optimizing performance of a millimeter wave concealed object detection system and that has the ability to protect security personnel and innocent by-standers from any potential threat or danger from a concealed object.

Another need exists in the art for a structural system for optimizing performance of a millimeter wave concealed object detection system having an environmentally-engineered internal configuration and construction allowing for a highly controlled inspection environment.

Another need exists in the art for a structural system for optimizing performance of a millimeter wave concealed object detection system that is suitable for imaging systems utilizing various forms of energy including millimeter waves, radio waves, visible light, infrared, ultraviolet, microwave energy.

Another need exists in the art for a structural system for optimizing performance of a millimeter wave concealed object detection system that increases the number of individuals that are screened.

Another need exists in the art for a structural system for optimizing performance of a millimeter wave concealed object detection system having maximum separation of screened persons and unscreened persons as well as the ability to closely deploy multiple millimeter wave concealed object detection systems in a side-by-side fashion.

Another need exists in the art for a structural system for optimizing performance of a millimeter wave concealed object detection system having a single concealed object detection system checkpoint lane, or multiple lanes.

Another need exists in the art for a structural system for optimizing performance of a millimeter wave concealed object detection system that includes complementary security technology or products including metal detectors, pan-tilt-zoom cameras, x-ray machines, radiological sensors, biometric sensors, iris scanners, palm scanners, finger print scanners, ID readers, etc.

However, in view of the prior art at the time the present invention was made, it was not obvious to those of ordinary skill in the pertinent art how the identified needs could be fulfilled.

IV. SUMMARY

In a particular embodiment, a structural system for optimizing performance of a millimeter wave concealed object detection system is disclosed. The system includes pre-engineered and pre-manufactured components to effectively speed the construction and the structural system of a concealed object detection system, streamline training, reduce the number of the structural system solutions required and lower the cost due to economies of scale. A shell is provided to house and protect the millimeter wave concealed object detection system so that the detection system can operate optimally in a controlled and managed environment by eliminating or mitigating spurious millimeter wave emissions or reflections from outside or inside the shell. The shell can be free-standing or attached to a parent structure. The entry and exit to the system is controlled by entry and exit barriers. In addition, an inspection lane is configured according to each particular application to guide a subject through the detection system.

One particular advantage provided by embodiments of the a structural system for optimizing performance of a millimeter wave concealed object detection system is that the components, techniques, designs and construction separately, or in combination, provide an advantageous, predictable, controlled and managed environment within which the concealed weapons/object detection system can operate. In addition, the need to adapt the system's cameras to an uncontrolled environment is eliminated.

Another particular advantage provided by embodiments of the structural system for optimizing performance of a millimeter wave concealed object detection system is that the disclosed system includes engineered solutions for wall construction, flooring, lighting, ambient millimeter wave energy mitigation, flow/traffic control, weather protection, decorative presentation, threat containment, blast mitigation, and reduction of peripheral visual/millimeter wave clutter.

Another particular advantage provided by embodiments of the structural system for optimizing performance of a millimeter wave concealed object detection system is the disclosed system may include engineered solutions for threat containment and blast mitigation.

Yet another particular advantage provided by embodiments of the structural system for optimizing performance of a millimeter wave concealed object detection system is that the system allows for configurations with either a single lane of access or multiple lanes of access for increased throughput and redundancy. Lanes may be equipped with either a common or a dedicated entry point, which may be controlled (magnetic locking door, controlled turnstile, etc), uncontrolled (isolation curtain, stanchions, manual door), neither or both. Lanes may be equipped with either a common or a dedicated exit point, which may be controlled (magnetic locking door, controlled turnstile, etc), uncontrolled (isolation curtain, manual door), neither or both.

Another particular advantage provided by embodiments of the structural system for optimizing performance of a millimeter wave concealed object detection system is that the system and method provide for flow control and pedestrian direction through the use of narrow corridors and access points, confining the subject within the concealed object detection system camera's field of view. Additionally, the system may employ extra equipment, such as turnstiles, pedestrian traffic lights, stanchions, etc., to control pedestrian traffic in a single file and/or one-at-a-time basis.

Another particular advantage provided by embodiments of the structural system for optimizing performance of a millimeter wave concealed object detection system is that the system may include provisions for internally or externally mounted heating, cooling or ventilation devices, or a combination thereof.

Another particular advantage provided by embodiments of the structural system for optimizing performance of a millimeter wave concealed object detection system is that the system may include an area to host internal security personnel, or may include an internal intercom system allowing external security personnel to remotely communicate with subjects inside the system while viewing the subject via the concealed object detection system internal camera and/or ancillary cameras or devices, thus providing "stand-off" protection from explosive detonations.

Still another particular advantage provided by embodiments of the structural system for optimizing performance of a millimeter wave concealed object detection system is that the disclosed system may use an external "annex-like" structure to serve as an access control point. This structure may be completely separate from the parent structure or may share architecture with the parent structure including but not limited to floors, subfloors, foundations, walls and roofs.

Another particular advantage provided by embodiments of the structural system for optimizing performance of a millimeter wave concealed object detection system is the use of an internal "lobby-compatible" architecture to serve as an access control point.

Another particular advantage provided by embodiments of the structural system for optimizing performance of a millimeter wave concealed object detection system is the ability to provide stand-alone or add-on implementations.

Another particular advantage provided by embodiments of the structural system for optimizing performance of a millimeter wave concealed object detection system is the ability to operate as either an entry portal for concealed weapons or object detection system or as an exit portal for theft prevention or both.

Another particular advantage provided by embodiments of the structural system for optimizing performance of a millimeter wave concealed object detection system is that the need to adapt the concealed object detection system camera(s) to an uncontrolled environment is eliminated.

Another particular advantage provided by embodiments of the structural system for optimizing performance of a millimeter wave concealed object detection system is that the need for the parent structure to be modified, expanded or re-engineered in order to accommodate the concealed object detection system equipment and logistics is eliminated. Further, the need to custom engineer a structural system for each concealed object detection system application is reduced.

Another particular advantage provided by embodiments of the structural system for optimizing performance of a millimeter wave concealed object detection system is the system reduces the risk to the parent structure by containing the threat detection process and perhaps explosive blasts within an external building designed with blast mitigation techniques.

Another particular advantage provided by embodiments of the structural system for optimizing performance of a millimeter wave concealed object detection system is that the system allows for a realization of manufacturing, engineering and procurement cost savings due to economies of scale.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 27:
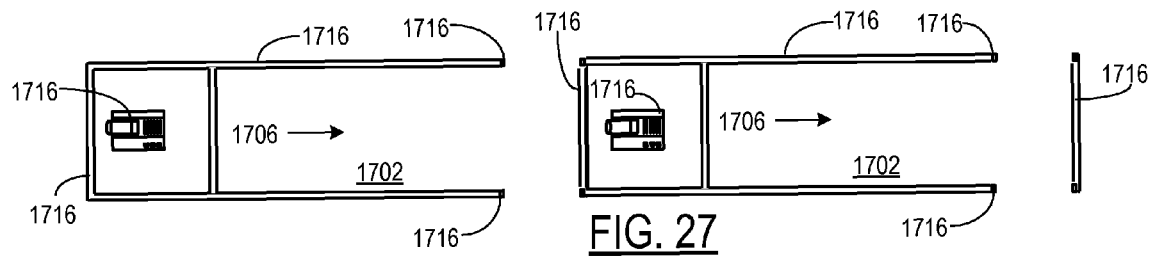
Figure 28:
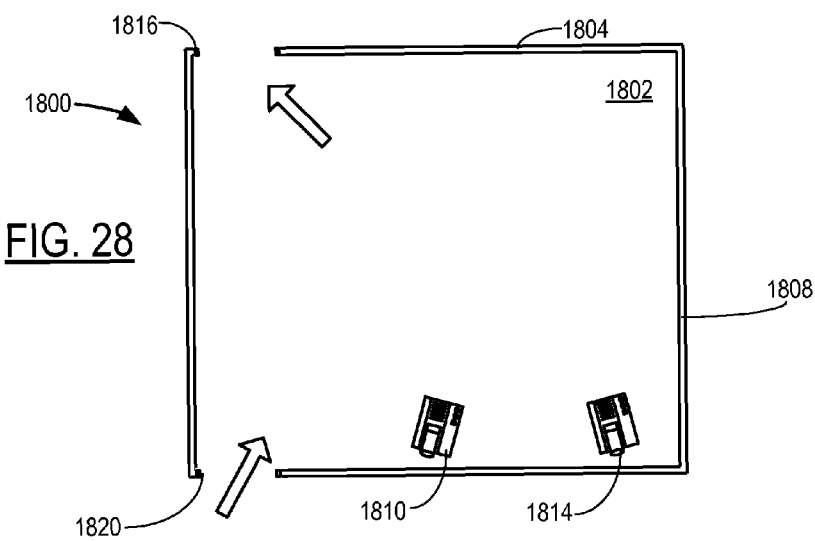

FIG. 27 is a plan view of an alternative embodiment of the structural system for optimizing performance of a millimeter wave concealed object detection system illustrating two adjacent single-unit systems; and FIG. 28 is a plan view of an alternative embodiment of the structural system for optimizing performance of a millimeter wave concealed object detection system illustrating a dual-unit open system with angled cameras.

VI. DETAILED DESCRIPTION

A structural system for optimizing performance of a millimeter wave concealed object detection system is disclosed. The system provides effective control of the structural system surroundings and provides a known and successful environment in which the millimeter wave equipment can operate. Several components, techniques, technologies and methodologies including external millimeter wave energy mitigation, peripheral motion or clutter mitigation, test subject isolation, motion and flow control, threat containment, weather protection, decorative presentation, blast mitigation, and others may each be used separately, or in combination, with the system. In addition, the system includes multiple implementations and realizations.

Figure 1:
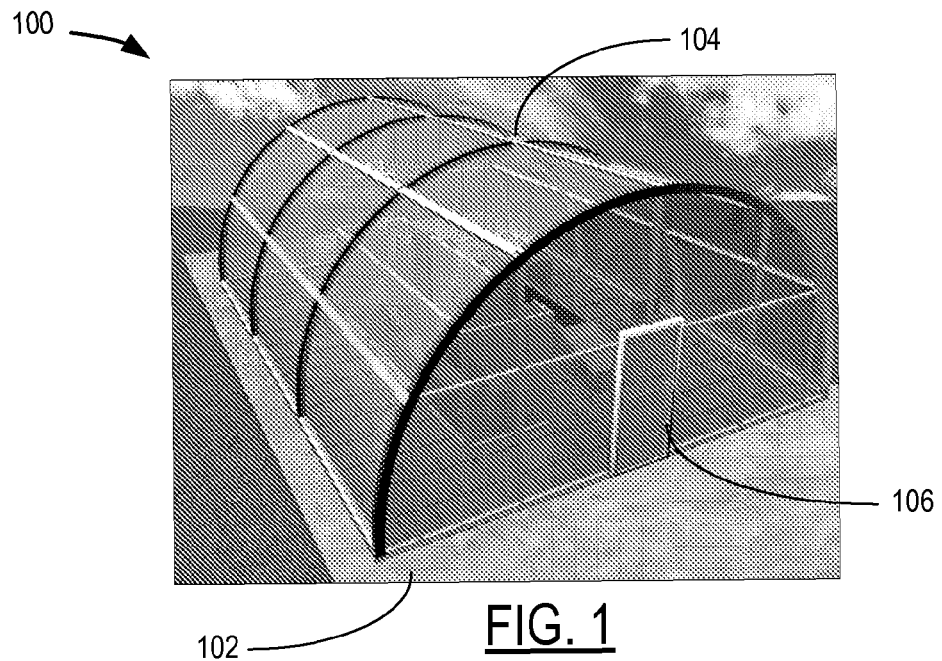
FIG. 1 is an exterior perspective view of a particular illustrative first embodiment of the structural system for optimizing performance of a millimeter wave concealed object detection system.

Referring to FIG. 1, a particular illustrative first embodiment of a structural system for optimizing performance of a millimeter wave concealed object detection system is disclosed. The structural system takes the form of a separate free-standing structure containing a controlled entry point, a concealed object detection system, and a controlled exit point that is directly attached to (or in close proximity to) an entry or exit point to the parent structure. The parent structure may be an airport terminal or office building, for example. The structural system includes a foundation 102, external shell 104, an entry barrier 106 located at one end of the structure 100, and an exit barrier 108 located at the opposite end of the structure 100. The entry barrier 106 and exit barrier 108 control entry and exit from the structure 100 and may be equipped with magnetic or other automatic locking devices, doors, gate, turnstiles or the like, or may be manually opened. Permission to enter and leave the structure 100 is controlled by electric signs, buzzers, intercoms, or guard personnel positioned on, near, or by entry barrier 106 and exit barrier 108 as may be convenient or as required by the application. In some embodiments, control of the entry and/or exit barriers may be performed via the concealed object detection system and/or Programmable Logic Controller (PLC) for autonomous control. The shell 104 is designed to provide protection from the weather to ensure correct operating temperatures for the millimeter wave concealed object detection system and other installed equipment. The shell 104 optimizes performance of the millimeter wave concealed object detection system by eliminating or mitigating spurious millimeter wave emissions from outside or inside the structure 100. In addition, the shell 104 may be designed with blast and/or weapon resistant features including blast hatches, external vents, blast proof or resistant materials, and other damage mitigation features. The structure 100 may be equipped with air conditioning and heating arrangements appropriate to the geographical location which will maintain an interior operating environment conducive to proper operation of the detection system 116, and the comfort of operating personnel and subjects.

Figure 2:
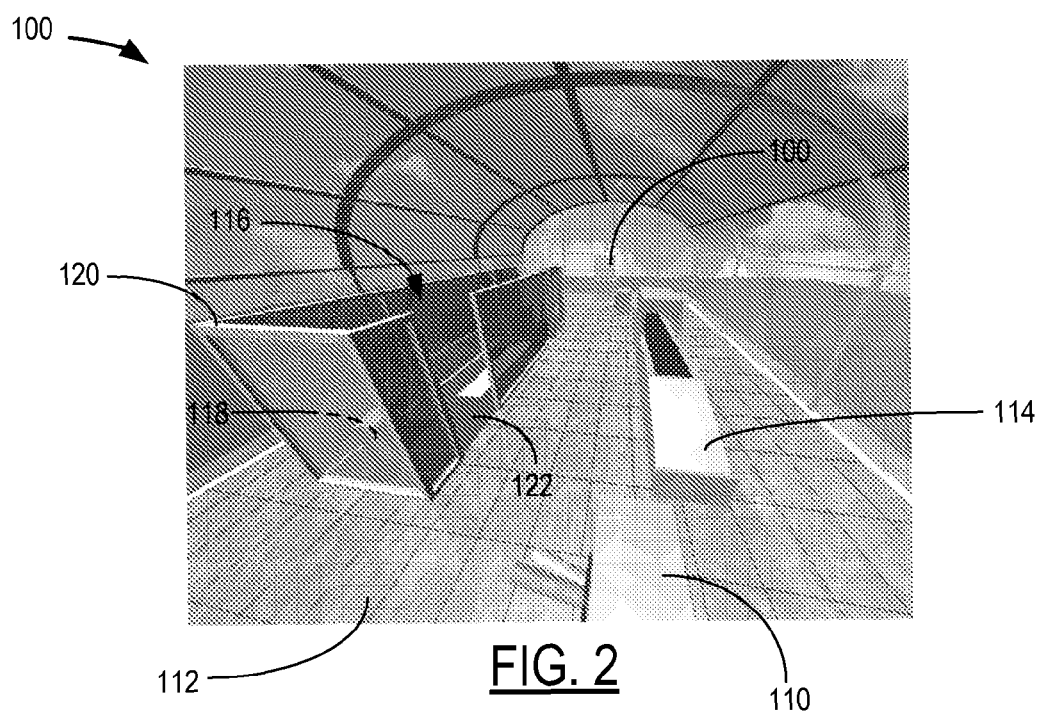
FIG. 2 is an interior perspective view of the particular illustrative first embodiment of the structural system for optimizing performance of a millimeter wave concealed object detection system.

The interior of structure 100 is provided with an entry control point equipped with a turnstile 110 or other devices including gates, fixed railings, and stanchions to control entry and direct subjects where required as shown in FIG. 2. The floor 112 may be constructed with materials that optimize performance of the millimeter wave concealed object detection system 116 by eliminating or mitigating spurious millimeter wave emissions and/or reflections from outside or inside the structure 100. A fixed or portable X-ray luggage scanner 114 or similar device for screening luggage and personal effects may be located adjacent/or within the millimeter wave concealed object detection system 116. The millimeter wave concealed object detection system 116 consists of one or more detectors or cameras 118 positioned so as to detect concealed explosives, weapons, contraband, objects or prohibited objects. The millimeter wave concealed object detection system 116 may be equipped with a surrounding wall or barrier structure 120 consisting of portable or permanently installed materials to optimize performance of the detection system 116 or control entry and exit to the detection system. The surrounding wall or barrier structure 120, if utilized, may be designed to mitigate the effects of blast or weapons. If a surrounding wall or barrier structure 120 is not installed, a turnstile or other devices including gates, fixed railings, and portable stanchions may be utilized to separate and define the millimeter wave concealed object detection system 116. The millimeter wave concealed object detection system 116 is provided with an entrance or entrances 122 used to control access to the detection system 116. The entrances may be equipped with a turnstile, gates, door, drapes, cloth, stanchion or other devices used to control entry to the detection system 116. The interior of the detection system 116 is provided with an inspection lane 124 designed with materials that can optimize performance of the millimeter wave concealed object detection system 116 by eliminating or mitigating spurious millimeter wave emissions from outside or inside structure 100. The inspection lane 124 may be equipped with various types of wall or ceiling mounted signage and/or floor arrows to assist subjects during the scanning process. An exit or exits 126 is or are provided at the end of the inspection lane 124 to allow subjects to leave the detection system 116.

Figures 3, 4:
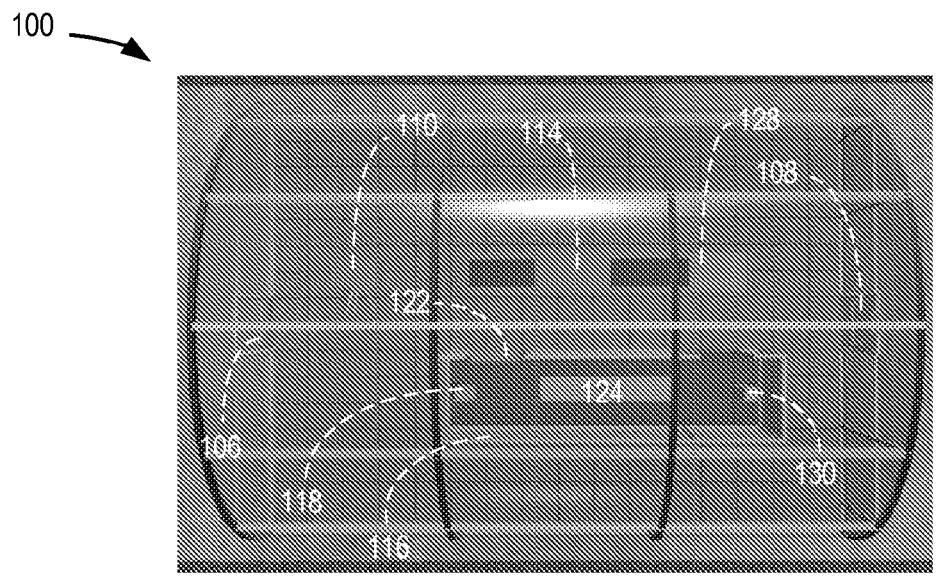
FIG. 3 is a top perspective view of the particular illustrative first embodiment of the structural system for optimizing performance of a millimeter wave concealed object detection system.
FIG. 4 is an exterior perspective view of a particular illustrative second embodiment of the structural system for optimizing performance of a millimeter wave concealed object detection system.

Referring now to FIG. 3, in operation the subject enters structure 100 through controlled access barrier 106. Upon entry, the subject passes through an optional turnstile 110 or an optional inner barrier or entrance vestibule. The subject is directed to the detection area by a guard and/or signage. The subject places his or her luggage and/or personal items in the X-ray scanner 114 to be scanned for explosives, weapons, or prohibited objects. The subject may be asked to remove his or her shoes and place them in the X-ray scanner or in or on an optional shoe scanner. When directed by a guard, signage, intercom, or buzzer the subject enters the millimeter wave concealed object detection system 116 via the entry 122. In a two camera system, the subject turns 90 degrees to enter the inspection lane 124. The subject traverses the inspection lane 124 at normal walking speed. The subject's back is scanned as he or she walks away from camera 118. The subject's front is scanned as he or she walks towards the camera 130. If the detection system 116 detects a possible explosive, weapon, or prohibited object, action is taken in accordance with local security procedures. If not, the subject exits the inspection lane 124 and picks up his or her personal effects at the X-ray scanner exit 128. The subject follows direction by a guard, signage, intercom, or buzzer and exits structure 100 via exit barrier 108.

For single weapons/object detection camera the structural systems, the subject may be commanded to stop and turn in front of the weapons/object camera and turn before continuing. In all cases, subjects may be commanded to raise their arms overhead to permit scanning and detection for concealed objects secreted under their arms.

The parent structure (e.g., airport terminal or office building) benefits from concealed object detection, and perhaps other security measures, conducted in a controlled, secured location directly outside of the parent structure, without requiring the structure to be placed at risk, modified, expanded or otherwise affected to incorporate the required security changes, equipment and logistics internally.

When used as an entry portal to a parent structure, upon successfully exiting the detection system, the subject is then mandated via the design of the structural system or via external components such as walls, fences, barricades, etc. to enter the parent structure. When used as an exit portal to a parent structure, the subject is mandated via the design of the structural system or via external components to exit the parent structure and enter the detection system.

Referring now to FIG. 4, a particular illustrative second embodiment of the structural system for optimizing performance of a millimeter wave concealed object detection system is disclosed. The structural system is based on a vestibule 200 or similar structure constructed directly adjacent to a new or existing parent structure such as an office building or similar facility. The structural system includes separate entry and exit points, and containing a concealed object or weapons detection system, that can be positioned in series with the legacy entry or exit of a parent structure such that instead of directly entering or exiting the parent structure via the legacy entrance/exit, entrance must be effected by first traversing the detection system and/or exit must be effected by subsequently traversing the detection system. Vestibule 200 includes a foundation 202, external walls 204, a wall or similar structure 206 shared with the adjacent building, an entry barrier 208 located at the end of the structure 200, and an exit barrier 210 located at the opposite end of the vestibule 200 which connects directly to an interior space 212 located in the adjacent building or facility. The entry barrier 208 and exit barrier 210 control entry and exit from the vestibule 200 and may be equipped with magnetic or other automatic locking devices, doors, turnstiles, gates, or may be manually opened. Permission to enter and leave the vestibule 200 is controlled by electric signs, buzzers, intercoms, or guard personnel positioned on, near, or by entry door 208 and exit door 210 as may be convenient or as required by the application. In some embodiments, control of the entry and/or exit barriers may be performed via the concealed object detection system and/or Programmable Logic Controller (PLC) for autonomous control. The external shell 204 and common-wall 206 are designed to provide protection from the weather to ensure correct operating temperatures for the millimeter wave concealed object detection system 214 and other installed equipment. The external shell 204 and common-wall 206 are designed to optimize performance of the millimeter wave concealed object detection system by eliminating or mitigating spurious millimeter wave emissions and/or reflections from outside or inside of vestibule 200. In addition, the external shell 204 and common-wall 206 include blast and/or weapon resistant features such as blast hatches, external vents, blast proof or resistant materials, and other damage mitigation features. The vestibule 200 may be equipped with air conditioning and heating arrangements appropriate to the geographical location which will maintain an interior operating environment conducive to proper operation of the detection system 214, and the comfort of operating personnel and subjects.

Figure 5:
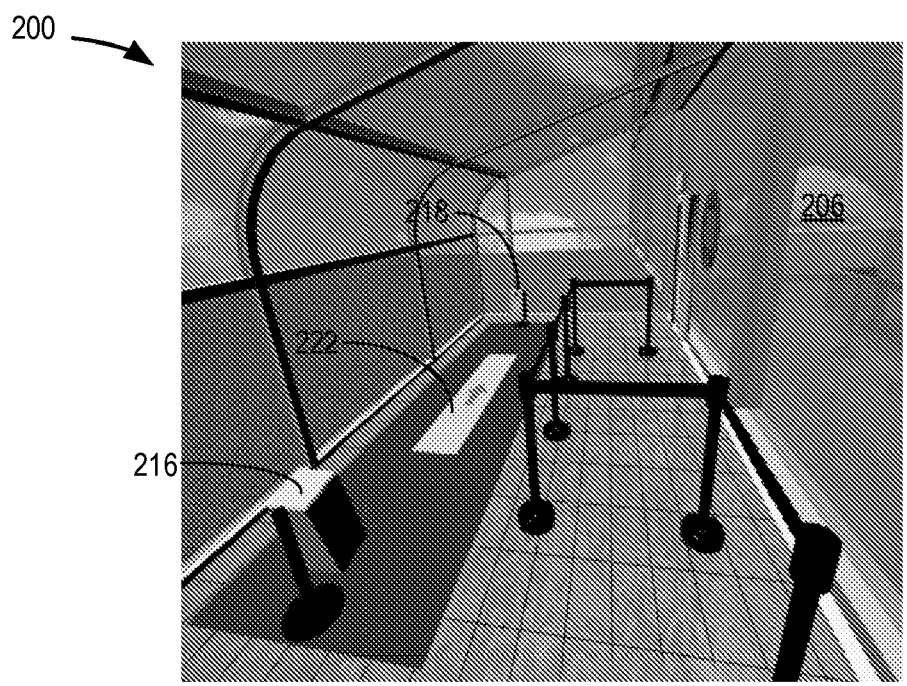
FIG. 5 is an interior perspective view of the particular illustrative second embodiment of the structural system for optimizing performance of a millimeter wave concealed object detection system.

The interior of vestibule 200 is provided with an entry control point optionally equipped with a turnstile or other devices including gates, fixed railings, and portable stanchions to control entry and direct subjects where required, as shown in FIG. 5. The floor 212 is constructed with materials that optimize performance of the millimeter wave concealed object detection system by eliminating or mitigating spurious millimeter wave emissions and/or reflections from outside or inside vestibule 200. The millimeter wave concealed object detection system 214 consists of one or more detectors or cameras 216 and 218 positioned so as to detect concealed explosives, weapons, or stolen items. The millimeter wave concealed object detection system 214 may be equipped with a surrounding wall or barrier structure consisting of portable or permanently installed materials to optimize performance of the millimeter wave concealed object detection system 214 or control entry and exit to the detection system 214. The surrounding wall or barrier structure, if utilized, may mitigate the effects of blast or weapons. If a surrounding wall or barrier structure is not installed, a turnstile or other devices including gates, fixed railings, and portable stanchions may be utilized to separate and define the millimeter wave concealed object detection system 214. The millimeter wave concealed object detection system 214 is provided with an entrance or entrances 220 used to control access to the detection system 214. The entrances may be equipped with a turnstile, gates, door, drapes, cloth, stanchion or other devices used to control entry to the detection system 214. The interior of the detection system 214 is provided with an inspection lane 222 designed with materials that can optimize performance of the millimeter wave concealed object detection system 214 by eliminating or mitigating spurious millimeter wave emissions from outside or inside vestibule 200. The inspection lane 222 may be equipped with various types of wall or ceiling mounted signage and floor arrows to assist subjects during the scanning process. An exit or exits 230 is or are provided at the end of the inspection lane 222 to allow subjects to leave the detection system 214. A fixed or portable X-ray luggage scanner 232 or similar device for screening luggage and personal effects is located in the adjacent building and accessed via exit 210.

Figure 6:
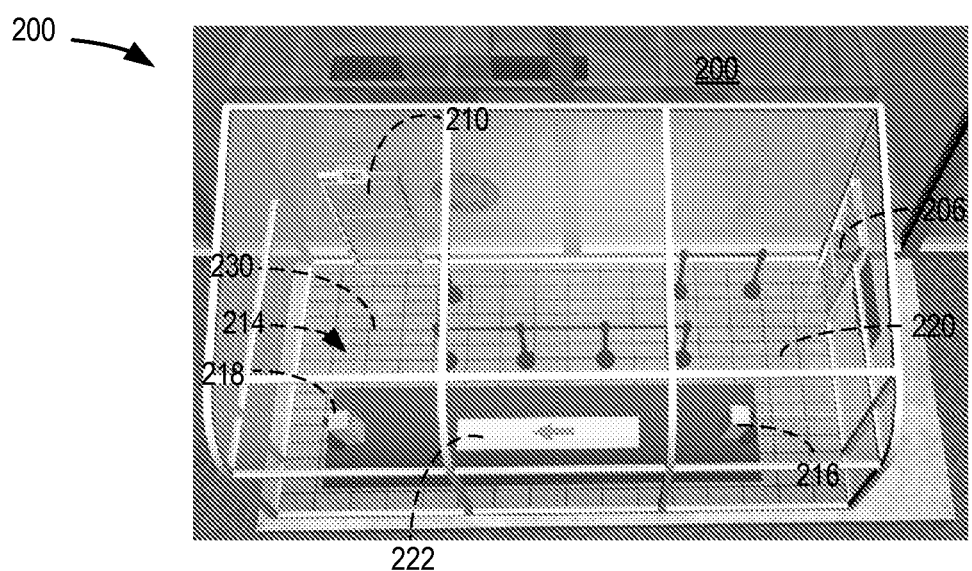
FIG. 6 is a top perspective view of the particular illustrative second embodiment of the structural system for optimizing performance of a millimeter wave concealed object detection system.
Figure 7:
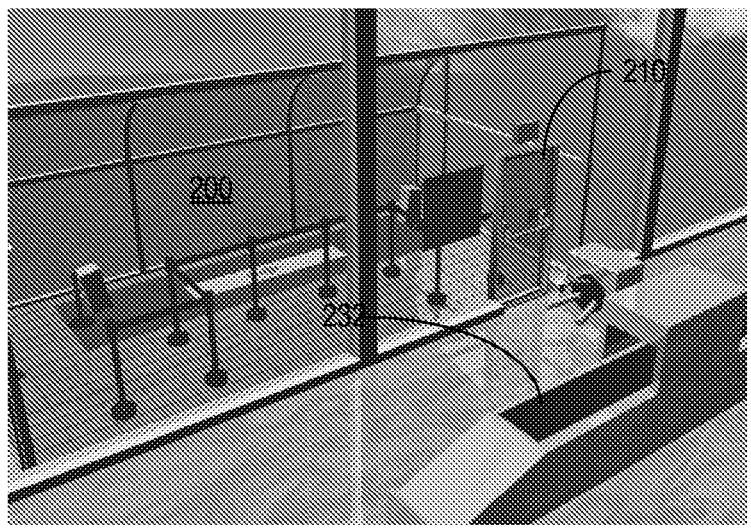
FIG. 7 is a perspective view of the particular illustrative second embodiment of the structural system for optimizing performance of a millimeter wave concealed object detection system from inside a parent structure.

Referring now to FIGS. 6 and 7, in operation the subject enters vestibule 200 through controlled access doorway 208. Upon entry, the subject may pass through an optional turnstile or an optional inner barrier. The subject is directed to the detection system 214 by a guard and/or signage. When directed by a guard, signage, intercom, or buzzer the subject enters the millimeter wave concealed object detection system 214 via the entry door or access point 220. In a two camera system, the subject turns 90 degrees to enter the inspection lane 222. The subject traverses the inspection lane 222 at normal walking speed. The subject's back is scanned as he or she walks away from camera 216. The subject's front is scanned as he or she walks towards the camera 218. For a one camera the structural system, the subject may be commanded to stop and turn in front of the weapons/object camera and turn before continuing. In all cases, subjects may be commanded to raise their arms overhead to permit scanning and detection for concealed objects secreted under their arms. If the detection system 214 detects a possible explosive, weapon, or stolen item, action is taken in accordance with local security procedures. If not, the subject exits the inspection lane 222 via exit point 230. The subject is directed by a guard, signage, intercom, or buzzer and exits vestibule 200 via exit barrier 210 and enters an entry hall 234 located in the adjacent parent structure 230.

Figure 8:
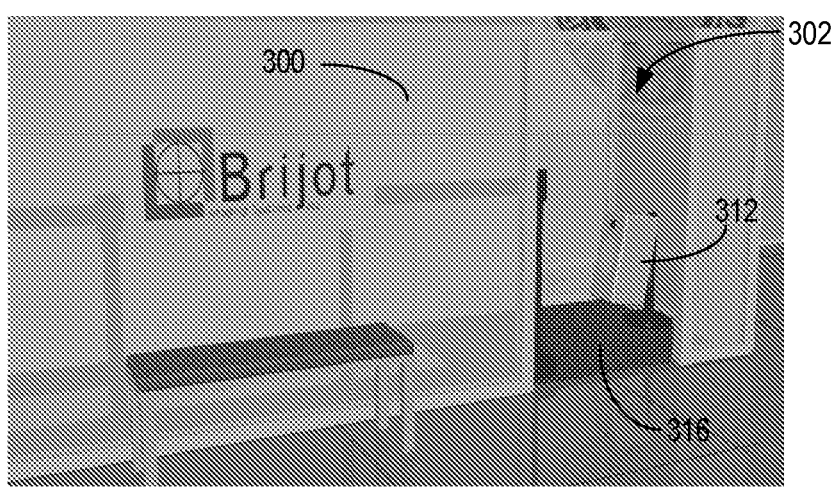
FIG. 8 is a perspective view of a particular illustrative third embodiment of the structural system for optimizing performance of a millimeter wave concealed object detection system.
Figure 9:
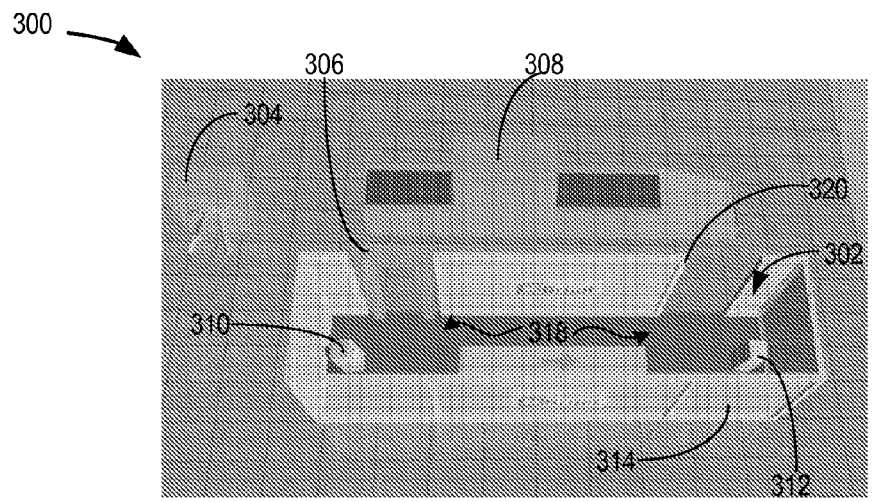
FIG. 9 is a top perspective view of the particular illustrative third embodiment of the structural system for optimizing performance of a millimeter wave concealed object detection system.
Figure 10:
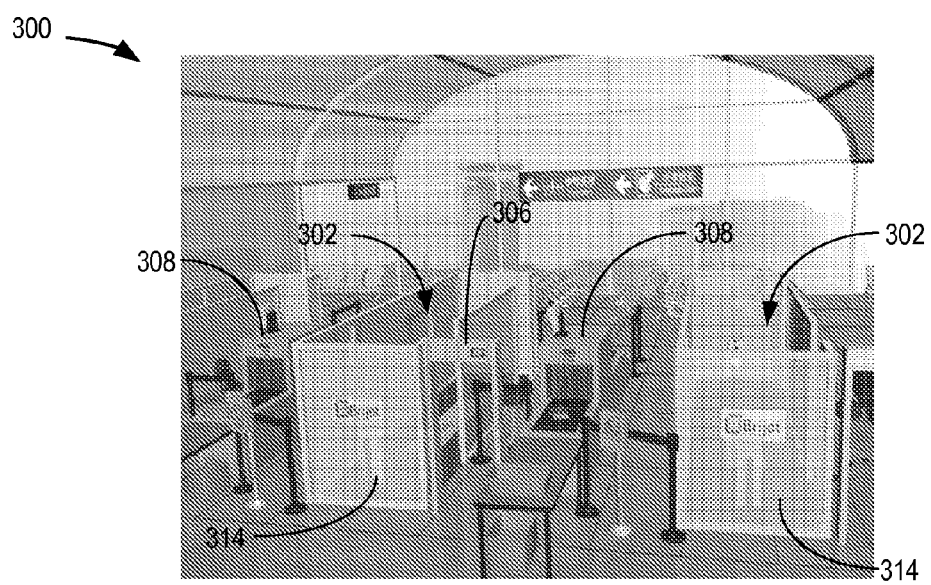
FIG. 10 is a front perspective view of the particular illustrative third embodiment of the structural system for optimizing performance of a millimeter wave concealed object detection system.

A particular third illustrative embodiment of a structural system for optimizing the performance of a millimeter wave concealed object detection system is disclosed in FIGS. 8-10. The structural system is installed within a pre-existing building or structure and may be installed adjacent to each other or at different locations within the parent structure. The millimeter wave concealed object detection system 302 is provided with an entrance or entrances 304 used to control access to the detection system 302. The entrances may be equipped with a turnstile, gates, door, drapes, cloth, stanchion or other devices used to control entry to the detection system 302. A fixed or portable magnetometer 306 or metal detector may be installed to provide concealed object detection of personal items constructed of ferrous materials. A fixed or portable X-ray luggage scanner 308 or similar device for screening luggage and personal effects may be located adjacent to the millimeter wave concealed object detection system 302. An optional shoe scanner may be located near or adjacent to the X-ray luggage scanner 308. The detection system 302 consists of one or more detectors or cameras 310, 312 positioned so as to detect concealed explosives, weapons, or prohibited objects. The detection system 302 may be equipped with a surrounding wall or barrier structure 314 consisting of portable or permanently installed materials to optimize performance of the millimeter wave concealed object detection system 302 or control entry to and exit from the detection system 302. The surrounding wall or barrier structure 314, if utilized, may be designed to mitigate the effects of blast or weapons. If a surrounding wall or barrier structure 314 is not installed, a turnstile or other devices including gates, fixed railings, and portable stanchions may be utilized to separate and define the millimeter wave concealed object detection system 302. The floor or floor covering 316 may be constructed with materials that optimize performance of the millimeter wave concealed object detection system 302 by eliminating or mitigating spurious millimeter wave emissions and/or reflections from outside or inside the parent structure. The interior of the system is provided with an inspection lane 318 designed with materials that can optimize performance of the millimeter wave concealed object detection system by eliminating or mitigating spurious millimeter wave emissions from outside or inside the parent structure. The inspection lane 318 may be equipped with various types of wall or ceiling mounted signage and floor arrows to assist subjects during the scanning process. An exit or exits 320 is or are provided at the end of the inspection lane 318 to allow subjects to leave the detection system 302.

In operation, the subject enters the millimeter wave concealed object detection system 302 through controlled access point 304. Upon entry the subject places his or her luggage and/or personal items in the X-ray scanner 308 to be scanned for explosives, weapons, or prohibited objects. The subject may be asked to remove his or her shoes and place them in the X-ray scanner 302 or in or on an optional shoe scanner. The subject passes through the optional fixed or portable magnetometer 306 which scans the subject for concealed items constructed of ferrous materials. Upon satisfactory completion of the fixed or portable magnetometer 306 scan, the subject is directed to the detection system 302 by a guard and/or signage. When directed by a guard, signage, intercom, or buzzer the subject enters the millimeter wave concealed object detection system 302 via the entry door or access point 322. In a two weapons/object detector camera the structural system, the subject turns 90 degrees to enter the inspection lane 318. The subject traverses the inspection lane 318 at normal walking speed. The subject's back is scanned as he or she walks away from camera 310. The subject's front is scanned as he or she walks towards the camera 312. If the system 302 detects a possible explosive, weapon, or stolen item, action is taken in accordance with local security procedures. For single weapons/object detector camera the structural systems, the subject may be commanded to stop and turn in front of the weapons/object camera before continuing. In all cases, subjects may be commanded to raise their arms overhead to permit scanning and detection for concealed objects secreted under their arms. If the subject passes the inspection process, he or she exits the inspection lane 318 via exit point 320. The subject picks up his or her personal effects at the X-ray scanner 308 and exits the structural system 300.

Figure 11:
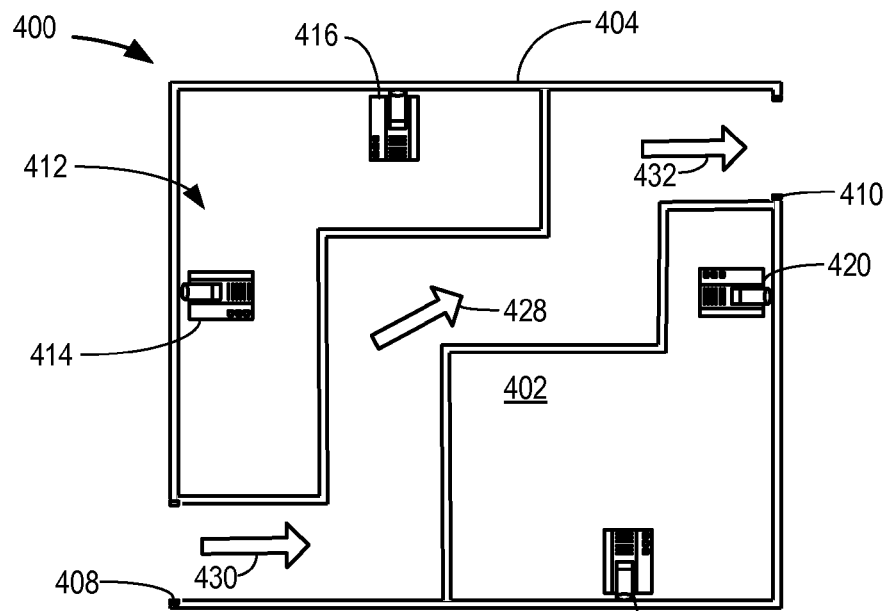
FIG. 11 is a plan view of an alternative embodiment of the structural system for optimizing performance of a millimeter wave concealed object detection system illustrating a four-unit high security portal embodiment of the system.

Referring now to FIG. 11, a particular illustrative fourth embodiment of a structural system for optimizing performance of a millimeter wave concealed object detection system is disclosed. The disclosed structural system is based on four-unit arrangement designed for high security detection of concealed weapons, explosives, and other objects. The structural system 400 is designed for use within a building, shed, or other structure and includes a concealed object or weapons detection system, that can be positioned in series with the entry or exit of the parent structure, shed or structure or elsewhere as appropriate. The structural system 400 may be have a floor covering 402 or additional add-on flooring designed to optimize performance of the millimeter wave concealed object detection system 412 by eliminating or mitigating spurious millimeter wave emissions and/or reflections from outside or inside the parent structure, shed, or structure. In addition, the structural system 400 may have walls 404, stanchions, or barriers designed to optimize performance of the millimeter wave concealed object detection system 412 by eliminating or mitigating spurious millimeter wave emissions and/or reflections from outside or inside the parent structure. Walls 404 may be used to provide secure access to the detection system 412. The walls 404 may be designed with blast and/or weapon resistant features including blast proof or resistant materials, and other damage mitigation features. The interior area of the structural system 400 is equipped with walls, guides, rails, stanchions, or other barriers designed to guide the subject through the detection system 412 at the required angles, turns, distances, and positions. In addition, the structural system 400 is equipped with an entry barrier 408 and exit barrier 410 to permit subjects entry and exit to and from the detection system 412. The entry barrier 406 and exit barrier 408 control entry and exit from the structural system 400 and may be equipped with magnetic or other automatic locking devices, doors, turnstiles, gates, or may be manually opened. Permission to enter and leave the structural system 400 is controlled by electric signs, buzzers, intercoms, or guard personnel positioned on, near, or by entry barrier 408 and exit barrier 410 as may be convenient or as required by the application. In some embodiments, control of the entry and/or exit barriers may be performed via the concealed object detection system and/or Programmable Logic Controller (PLC) for autonomous control. An access walkway 430 is located immediately adjacent to the entry barrier 408. Walkway 430 leads the subject to the inspection lane 428. An exit walkway 432 is located immediately after the inspection lane 428. Exit walkway 432 leads the subject to the exit barrier 410. Further, structural system 400 may be equipped with air conditioning and heating arrangements appropriate to the geographical location which will maintain an interior operating environment conducive to proper operation of the detection system 412, and the comfort of operating personnel and subjects.

The interior of the structural system 400 is provided with an entry barrier 408 or control point optionally equipped with a turnstile or other devices including gates, fixed railings, and portable stanchions to control entry and direct subjects where required. The millimeter wave concealed object detection system 412 consists of cameras 414, 416, 418, and 420 positioned so as to provide 360 degrees of scanning coverage to facilitate detection of concealed explosives, weapons, or prohibited objects. The interior of the detection system 412 is provided with an inspection lane 428 designed with materials that can optimize performance of the millimeter wave concealed object detection system 412 by eliminating or mitigating spurious millimeter wave emissions from outside or inside the parent structure, shed, or structure. The inspection lane 428 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the detection system 412 depending on application.

In operation, the subject enters the structural system 400 through a controlled access doorway 408. Upon entry, the subject may pass through an optional turnstile or an optional inner barrier or entrance area. The subject is directed to the detection system 412 by a guard and/or signage. When directed by a guard, signage, intercom, or buzzer the subject enters the millimeter wave concealed object detection system 412 via the entry barrier or access point 408. The subject traverses the access walkway 430 to reach the inspection lane 428. In a four camera system, the subject turns approximately 90 degrees to enter the inspection lane 428. The subject traverses the inspection lane 428 at normal walking speed. The subject's back is scanned as he or she walks away from camera 414. The subject's left and right sides are scanned by cameras 416 and 418 depending upon the direction of entry of the subject as required by the orientation of the structural system 400 with respect to its position in the parent structure, shed, or structure. The subject's front is scanned as he or she walks towards the camera 420. In all cases, subjects may be commanded to raise their arms overhead to permit scanning and detection for concealed objects secreted under their arms. If the system 412 detects a possible explosive, weapon, or stolen item, action is taken in accordance with local security procedures. If not, the subject turns approximately 90 degrees and exits the inspection lane 428 via exit walkway 426. Upon reaching exit barrier 410, the subject departs the structural system 400 as directed by a guard, signage, intercom, or buzzer.

Figure 12:
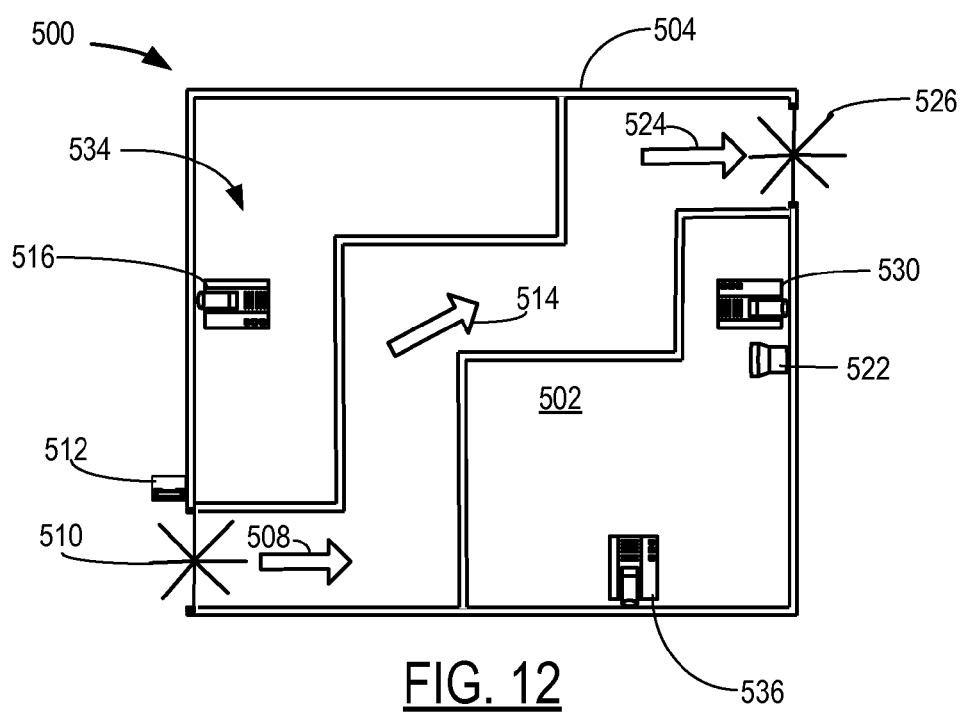
FIG. 12 is a plan view of an alternative embodiment of the structural system for optimizing performance of a millimeter wave concealed object detection system illustrating a three-unit high security automated turnstile portal.

Referring now to FIG. 12, a particular illustrative fifth embodiment of the system for optimizing performance of a millimeter wave concealed object detection system is disclosed. The structural system 500 is based on a three-unit high security automated turnstile portal designed for detection of concealed weapons, explosives, and other objects. The structural system 500 is designed for use within a building, shed, or other structure and includes a concealed object or weapons detection system, that can be positioned in series with the entry or exit of the parent structure, shed or structure or elsewhere as appropriate. The structural system 500 may have a floor covering 502 or additional add-on flooring designed to optimize performance of the millimeter wave concealed object detection system 534 by eliminating or mitigating spurious millimeter wave emissions and/or reflections from outside or inside the parent structure, shed, or structure. In addition, the structural system 500 may have walls 504, stanchions, or barriers designed optimize performance of the millimeter wave concealed object detection system 534 by eliminating or mitigating spurious millimeter wave emissions and/or reflections from outside or inside the parent structure. Walls 504 may be used to provide secure access to structural system 500. In addition, the walls 504 may be designed with blast and/or weapon resistant features including blast proof or resistant materials, and other damage mitigation features. The interior area of the structural system 500 is equipped with walls, guides, rails, stanchions, or other barriers designed to guide the subject through the system at the required angles, turns, distances, and positions. Further, the structural system 500 is equipped with an entry barrier 510 and exit barrier 526 equipped with automated turnstiles, gates, doors, magnetic locks, or other devices designed to control entry and exit from the structural system 500. Entry barrier 510 and exit barrier 526 may also be designed to permit manual control of installed automated turnstiles and other security devices. Entry barrier 510 is equipped with a two-way intercom 512 to permit remote communication between the guard and the subject. The guard uses two-way intercom 512 to control and regulate permission and timing of entry to the structural system 500. An additional two-way intercom 522 is installed inside the structural system 500 to provide security personnel with the ability to remotely communicate with the subject as necessary. Other measures may be used to supplement the two-way intercoms 512 and 522. These measures include electric signs, monitors, buzzers, intercoms, or guard personnel positioned on, near, or by entry barrier 510 and exit barrier 526 as may be convenient or as required by the application. Closed circuit television cameras in addition to those installed in the concealed object or weapons detection system may be installed to provide security personnel with the ability to monitor subjects remotely as they wait for entry, enter, transverse, or exit from the structural system 500. In some embodiments, control of the entry and/or exit barriers may be performed via the concealed object detection system 534 and/or Programmable Logic Controller (PLC) for autonomous control. An access walkway 508 is located immediately adjacent to the entry barrier 510. Walkway 508 leads the subject to the inspection lane 514 located within the concealed object or weapons detection system 534. An exit walkway 524 is located immediately after the inspection lane 520. Exit walkway 524 leads the subject to the exit barrier and automated turnstile 526. The structural system 500 may be equipped with air conditioning and heating arrangements appropriate to the geographical location which will maintain an interior operating environment conducive to proper operation of the detection system 534, and the comfort of operating personnel and subjects.

The interior of the structural system 500 is provided with a millimeter wave concealed object detection system 534 consisting of cameras 516, 530, and 536 positioned so as to provide full front and back scanning coverage to facilitate detection of concealed explosives, weapons, or prohibited objects. The interior of system 534 is provided with an inspection lane 514 designed with materials that can optimize performance of the millimeter wave concealed object detection system 534 by eliminating or mitigating spurious millimeter wave emissions from outside or inside the parent structure, shed, or structure. The inspection lane 514 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the system 514 depending on circumstances.

In operation, the subject enters the structural system 500 through controlled access automated turnstile and doorway 510 when directed to do so by security personnel using two-way intercom 512 or by some other means which might include a guard stationed at the entry or by signage. Upon entry, the subject may pass through an optional inner barrier or entrance vestibule. The subject is directed to the detection system 534 by security personnel using the two-way intercom 522 and/or by signage. The subject traverses the access walkway 508 to reach the inspection lane 514. When directed by security personnel using two-way intercom 522, or by signage, buzzer, or other means, the subject enters inspection lane 514. In a three camera system, the subject turns approximately 90 degrees to enter the inspection lane 514. The subject traverses the inspection lane 514 at normal walking speed. As the subject transits the inspection lane 514, his or her back is scanned for evidence of weapons, explosives, or other objects by camera 516. As the subject continues towards the end of the inspection lane 514, he or she is frontally scanned by camera 530. Upon reaching the end of the inspection lane, the subject turns approximately 90 degrees into the exit walkway 524, and his or her back is scanned by camera 536. In all cases, subjects may be commanded via two-way intercom 522 to raise their arms overhead to permit scanning and detection for concealed objects secreted under their arms. If the detection system 534 detects a possible explosive, weapon, or stolen item, action is taken in accordance with local security procedures. If not, the subject exits the structural system 500 as directed by a guard, signage, intercom, or buzzer via exit barrier automated turnstile 526.

Figure 13:
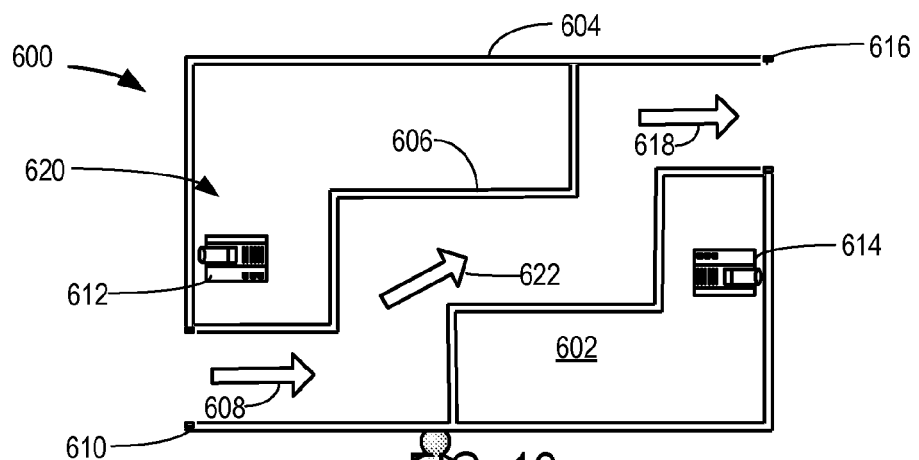
FIG. 13 is a plan view of an alternative embodiment of the structural system for optimizing performance of a millimeter wave concealed object detection system illustrating a dual-unit portal with stanchions.
Figure 14:
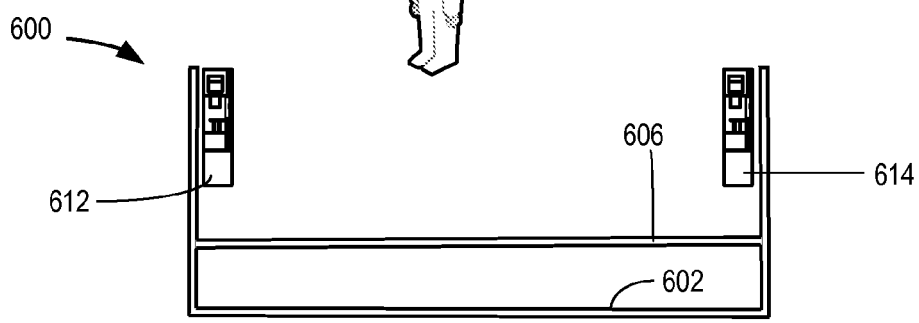
FIG. 14 is a side view of an alternative embodiment of the structural system for optimizing performance of a millimeter wave concealed object detection system illustrating a dual-unit portal with stanchions.

Referring now to FIGS. 13 and 14 a particular illustrative sixth embodiment of a structural system for optimizing performance of a millimeter wave concealed object detection system is disclosed. The disclosed system 600 is based on a dual-unit portal with stanchions designed for detection of concealed weapons, explosives, and other objects. The structural system 600 is designed for use within a building, shed, or other structure and includes a concealed object or weapons detection system that can be positioned in series with the entry or exit of the parent structure, shed or structure or elsewhere as appropriate. The structural system 600 may have a floor covering 602 or additional add-on flooring designed to optimize performance of the millimeter wave concealed object detection system 620 by eliminating or mitigating spurious millimeter wave emissions and/or reflections from outside or inside the parent structure, shed, or structure. The structural system 600 will normally be deployed with stanchions, but it also may have walls 604, stanchions, or barriers designed to optimize performance of the millimeter wave concealed object detection system 620 by eliminating or mitigating spurious millimeter wave emissions and/or reflections from outside or inside the parent structure. Walls 604 may be used to provide secure access to the structural system 600. In addition, the walls 604 may be designed with blast and/or weapon resistant features including blast proof or resistant materials, and other damage mitigation features. The interior area of the structural system 600 is equipped with walls 606 and/or, guides, rails, stanchions, or other barriers designed to guide the subject through the system at the required angles, turns, distances, and positions. The structural system 600 is equipped with an entry 610 and exit 616 equipped with automated turnstiles, gates, doors, magnetic locks, or other devices designed to control entry and exit from the structural system 600. Entry 610 and exit 616 may also be designed to permit manual control of installed turnstiles and other security devices if installed. Subjects move through the system as directed by electric signs, monitors, buzzers, intercoms, or guard personnel positioned on, near, or by entry 610 and exit barrier 616 as may be convenient or as required by the application. Closed circuit television cameras in addition to those installed in the concealed object or weapons detection system 620 may be installed to provide security personnel with the ability to monitor subjects remotely as they wait for entry, enter, transverse, or exit from the detection system 620. In some embodiments, control of the entry and/or exit barriers may be performed via the concealed object detection system and/or Programmable Logic Controller (PLC) for autonomous control. An access walkway 608 is located immediately adjacent to the entry barrier 610. Walkway 608 leads the subject to the inspection lane 622 located within the concealed object or weapons detection system 620. An exit walkway 618 is located immediately after the inspection lane 622. Exit walkway 618 leads the subject to the exit 616. The structural system 600 may be equipped with air conditioning and heating arrangements appropriate to the geographical location which will maintain an interior operating environment conducive to proper operation of the system, and the comfort of operating personnel and subjects.

The interior of the structural system 600 is provided with a millimeter wave concealed object detection system 620 consisting of cameras 612 and 614 which are positioned so as to provide full front and back scanning coverage to facilitate detection of concealed explosives, weapons, or prohibited objects. The interior of the structural system 600 is provided with an inspection lane 622 designed with materials that can optimize performance of the millimeter wave concealed object detection system 620 by eliminating or mitigating spurious millimeter wave emissions from outside or inside the parent structure, shed, or structure. The inspection lane 622 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the detection system 620 depending on circumstances.

In operation, the subject enters the structural system 600 through controlled entry 610 when directed to do so by security personnel, signage, or some other device. Upon entry, the subject passes through walkway 608. The subject is directed to the detection system 620 by security personnel and/or by signage. The subject traverses the walkway 608 to reach the inspection lane 622. When directed by security personnel or by signage, buzzer, or other means, the subject enters inspection lane 622. In a dual unit system, the subject turns approximately 90 degrees to enter the inspection lane 622. The subject traverses the inspection lane 622 at normal walking speed. As the subject traverses the inspection lane 622, his or her back is scanned for evidence of weapons, explosives, or other objects by camera 612. As the subject continues towards the end of the inspection lane 622, he or she is frontally scanned by camera 614. Upon reaching the end of the inspection lane, the subject turns approximately 90 degrees into the exit walkway 618. In all cases, subjects may be commanded to raise their arms overhead to permit scanning and detection for concealed objects secreted under their arms. If the detection system 620 detects a possible explosive, weapon, or stolen item, action is taken in accordance with local security procedures. If not, the subject exits the structural system 600 as directed by a guard, signage, intercom, or buzzer via exit 616.

Figure 15:
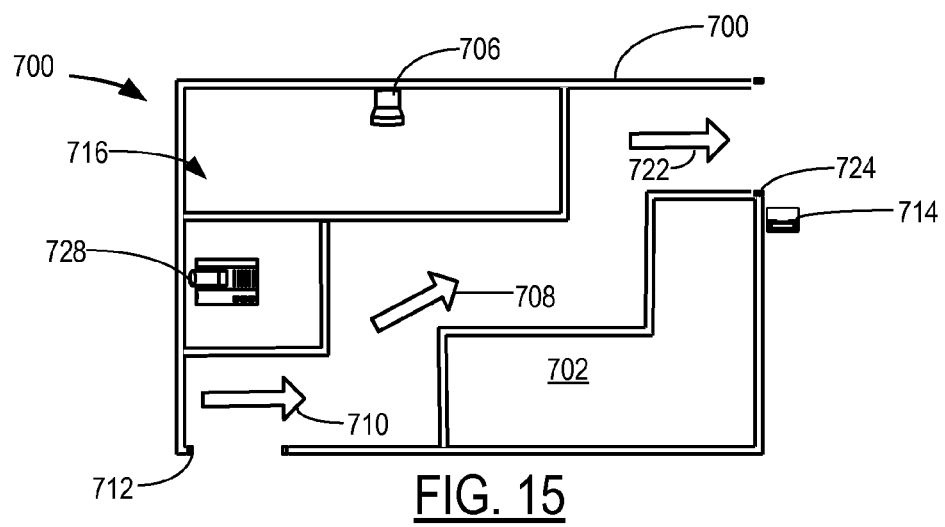
FIG. 15 is a plan view of an alternative embodiment of the structural system for optimizing performance of a millimeter wave concealed object detection system illustrating a single-unit low volume attended portal.

Referring now to FIG. 15, a particular illustrative seventh embodiment of a structural system for optimizing performance of a millimeter wave concealed object detection system is disclosed. The disclosed system 700 is based on a single-unit low volume attended portal designed for detection of concealed weapons, explosives, and other objects. The structural system 700 is designed for use within a building, shed, or other structure and includes a concealed object or weapons detection system, that can be positioned in series with the entry or exit of the parent structure, shed or structure or elsewhere as appropriate. The structural system 700 may have a floor covering 702 or additional add-on flooring designed to optimize performance of the millimeter wave concealed object detection system 716 by eliminating or mitigating spurious millimeter wave emissions and/or reflections from outside or inside the parent structure, shed, or structure. The structural system 700 will normally be deployed with walls of various heights 704 and stanchions 718. The walls or barriers may be designed to optimize the performance of the millimeter wave concealed object detection system 716 by eliminating or mitigating spurious millimeter wave emissions and/or reflections from outside or inside the parent structure, or shed. Walls 704 may be used to provide secure access to the structural system 700. In addition, the walls 704 may be designed with blast and/or weapon resistant features including blast proof or resistant materials, and other damage mitigation features. The interior area of the structural system 700 is equipped with stanchions 718, guides, rails, or other barriers designed to guide the subject through the detection system 716 at the required angles, turns, distances, and positions. The structural system 700 is equipped with an entry 712 and exit 726 equipped with automated turnstiles, gates, doors, magnetic locks, or other devices designed to control entry and exit from the system. Entry 712 and exit 726 may also be designed to permit manual control of turnstiles and other security devices if installed. Subjects move through the system as directed by intercoms, electric signs, monitors, buzzers, or guard personnel positioned on, near, or by entry 712 and exit barrier 726 as may be convenient or as required by the application. Closed circuit television cameras in addition to those installed in the concealed object or weapons detection system 716 may be installed to provide security personnel with the ability to monitor subjects remotely as they wait for entry, enter, transverse, or exit from the detection system 716. In some embodiments, control of the entry and/or exit barriers may be performed via the concealed object detection system and/or Programmable Logic Controller (PLC) for autonomous control. An access walkway 710 is located immediately adjacent to the entry barrier 712. Walkway 710 leads the subject to the inspection lane 708 located within the concealed object or weapons detection system 716. An exit walkway 722 is located immediately after the inspection lane 708. Exit walkway 722 leads the subject to the exit 724. The structural system 700 may be equipped with air conditioning and heating arrangements appropriate to the geographical location which will maintain an interior operating environment conducive to proper operation of the system, and the comfort of operating personnel and subjects.

The interior of the structural system 700 is provided with a millimeter wave concealed object detection system 716, including a camera 728 which is positioned so as to provide full front and back scanning coverage when a subject stops and turns 360 degrees to facilitate detection of concealed explosives, weapons, or prohibited objects. The detection system 716 is provided with an inspection lane 708 designed with materials that can optimize performance of the millimeter wave concealed object detection system by eliminating or mitigating spurious millimeter wave emissions from outside or inside the parent structure, shed, or structure. The inspection lane 708 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the system 716 depending on circumstances.

In operation, the subject enters the structural system 700 through controlled entry 712 when directed to do so by security personnel over a two-way intercom 714, signage, or some other device. Upon entry, the subject passes through access walkway 710. The subject is directed to the detection system 716 by security personnel over a two-way intercom 714 and/ or by signage. The subject traverses the walkway 710 to reach the inspection lane 708. When directed by security personnel or by signage, buzzer, or other means, the subject enters inspection lane 708. The subject stops at position 720 which is marked by floor markings and/or signage. The subject slowly rotates 360 degrees to permit camera 728 to fully-scan his or her body for evidence of weapons, explosives, or other objects. In all cases, subjects may be commanded via two-way intercom 714 to raise their arms overhead to permit scanning and detection for concealed objects secreted under their arms. If the system detects a possible explosive, weapon, or stolen item, action is taken in accordance with local security procedures. If no weapons, explosives, or banned objects are detected, security personnel use the two-way intercom 714 to command the subject to exit the inspection lane 708 and the structural system 700. Upon reaching the end of the inspection lane, the subject turns approximately 90 degrees into the exit walkway 722. The subject walks through exit corridor 726 and then exits the system as directed via exit 724.

Figure 16:
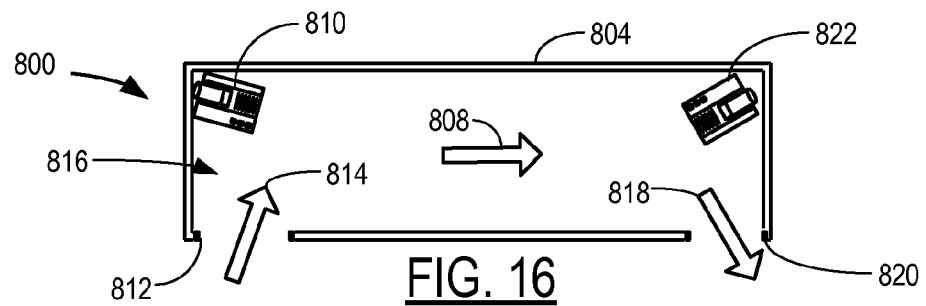
FIG. 16 is a plan view of an alternative embodiment of the structural system for optimizing performance of a millimeter wave concealed object detection system illustrating a dual-unit compact system.

Referring now to FIG. 16, a particular illustrative eighth embodiment of the system for optimizing performance of a millimeter wave concealed object detection system is disclosed. The disclosed system 800 is based on a dual-unit compact system designed for detection of concealed weapons, explosives, and other objects. The system is designed for use within a building, shed, or other structure and includes a concealed object or weapons detection system that can be positioned in series with the entry or exit of the parent structure, shed or structure or elsewhere as appropriate. The structural system 800 may have a floor covering 802 or additional add-on flooring designed to optimize performance of the millimeter wave concealed object detection system 816 by eliminating or mitigating spurious millimeter wave emissions and/or reflections from outside or inside the parent structure, shed, or structure. The structural system 800 will normally be deployed with walls of various heights 804. The walls or barriers may be designed to optimize the performance of the millimeter wave concealed object detection system 816 by eliminating or mitigating spurious millimeter wave emissions and/or reflections from outside or inside the parent structure, or shed. Walls 804 may be used to provide secure access to the structural system 800. In addition, the walls 804 may be designed with blast and/or weapon resistant features including blast proof or resistant materials, and other damage mitigation features. The interior area of the structural system 800 may be equipped with stanchions 818, guides, rails, or other barriers designed to guide the subject through the detection system 816 at the required angles, turns, distances, and positions. The structural system 800 is equipped with an open entry 812 and open exit 820. The entry 812 and exit 820 may be equipped with automated turnstiles, gates, doors, magnetic locks, or other devices designed to control entry and exit from the structural system 800. Entry 812 and exit 820 may also be designed to permit manual control of turnstiles and other security devices if installed. Subjects move through the detection 816 system as directed by intercoms, electric signs, monitors, buzzers, or guard personnel positioned on, near, or by entry 812 and exit barrier 820 as may be convenient or as required by the application. Closed circuit television cameras in addition to those installed in the concealed object or weapons detection system 816 may be installed to provide security personnel with the ability to monitor subjects remotely as they wait for entry, enter, transverse, or exit from the detection system 816. In some embodiments, control of the entry and/or exit barriers may be performed via the concealed object detection system and/or Programmable Logic Controller (PLC) for autonomous control. The structural system 800 may be equipped with air conditioning and heating arrangements appropriate to the geographical location which will maintain an interior operating environment conducive to proper operation of the detection system 816, and the comfort of operating personnel and subjects.

The interior of the structural system 800 is provided with a millimeter wave concealed object detection system 816 consisting of two cameras 810 and 822 which are positioned so as to provide full front and back scanning coverage when subject traverses the inspection lane 808 to facilitate detection of concealed explosives, weapons, or prohibited objects. The detection system 816 is provided with an inspection lane 808 designed with materials that can optimize performance of the millimeter wave concealed object detection system 816 by eliminating or mitigating spurious millimeter wave emissions from outside or inside the parent structure, shed, or structure. The inspection lane 808 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the detection system 816 depending on circumstances.

In operation, the subject enters the structural system 800 through entry 812 when directed to do so by security personnel, signage, or some other device. Upon entry, the subject turns approximately 70 degrees at point 814 and follows arrows or other markings on the floor of the inspection lane. The floor markings guide the subject to point 806 where the subject turns and continues to follow the floor markings to point 818 where the subject turns approximately 70 degrees to exit the inspection lane 808. Passage at normal walking speed through points 814, 806, and 818 permits the system to scan the front and back of the subject for evidence of weapons, explosives, or other objects. In all cases, subjects may be commanded by security personnel, two-way intercom, or some other method to raise their arms overhead to permit scanning and detection for concealed objects secreted under their arms. If the detection system 816 detects a possible explosive, weapon, or stolen item, action is taken in accordance with local security procedures. If no weapons, explosives, or banned objects are detected, security personnel permit the subject to exit the inspection lane 808 and the structural system 800 via exit 820.

Figure 17:
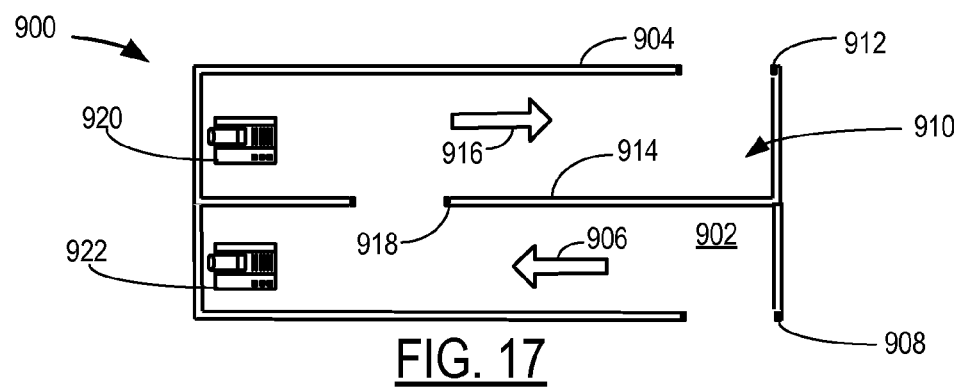
FIG. 17 is a plan view of an alternative embodiment of the structural system for optimizing performance of a millimeter wave concealed object detection system illustrating a dual-unit "U" turn system.

Referring now to FIG. 17, a particular illustrative ninth embodiment of a structural system for optimizing performance of a millimeter wave concealed object detection system is disclosed. The disclosed system is based on a dual-unit low "U" turn system designed for detection of concealed weapons, explosives, and other objects. The structural system 900 is for use within a building, shed, or other structure and includes a concealed object or weapons detection system that can be positioned in series with the entry or exit of the parent structure, shed or structure or elsewhere as appropriate. The structural system 900 may have a floor covering 902 or additional add-on flooring designed to optimize performance of the millimeter wave concealed object detection system 910 by eliminating or mitigating spurious millimeter wave emissions and/or reflections from outside or inside the parent structure, shed, or structure. The structural system 900 will normally be deployed with walls 904 and partitions 914 of various heights. The walls or barriers may be designed to optimize the performance of the millimeter wave concealed object detection system 910 by eliminating or mitigating spurious millimeter wave emissions and/or reflections from outside or inside the parent structure, or shed. Walls 904 may be used to provide secure access to the structural system 900. In addition, the walls 904 and partitions 914 may be designed with blast and/or weapon resistant features including blast proof or resistant materials, and other damage mitigation features. The interior area of the structural system 900 is equipped with partitions 914 and other guides, rails, or barriers designed to guide the subject through the detection system 910 at the required angles, turns, distances, and positions. The structural system 900 is equipped with an entry 908 and exit 912 which can be open or equipped with automated turnstiles, gates, doors, magnetic locks, or other devices designed to control entry and exit from the structural system 900. Entry 908 and exit 912 may also be designed to permit manual control of turnstiles and other security devices if installed. Subjects move through the system as directed by intercoms, electric signs, monitors, buzzers, or guard personnel positioned on, near, or by entry 908 and exit barrier 912 as may be convenient or as required by the application. Closed circuit television cameras in addition to those installed in the concealed object or weapons detection system 910 may be installed to provide security personnel with the ability to monitor subjects remotely as they wait for entry, enter, transverse, or exit from the system 910. In some embodiments, control of the entry and/or exit barriers may be performed via the concealed object detection system and/or Programmable Logic Controller (PLC) for autonomous control. The structural system 900 may be equipped with air conditioning and heating arrangements appropriate to the geographical location which will maintain an interior operating environment conducive to proper operation of the system, and the comfort of operating personnel and subjects.

The interior of the structural system 900 is provided with a millimeter wave concealed object detection system 910 consisting of two cameras 920 and 922 which are positioned so as to provide full front and back scanning coverage when subject traverses the length of both inspection lanes 906 and 916. The system 916 provides for detection of concealed explosives, weapons, or prohibited objects. The two inspection lanes 906 and 916 may be designed with materials that can optimize performance of the millimeter wave concealed object detection system 910 by eliminating or mitigating spurious millimeter wave emissions from outside or inside the parent structure, shed, or structure. The inspection lanes 906 and 916 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with detection system 916 depending on circumstances.

In operation, the subject enters the structural system 900 through controlled entry 908 when directed to do so by security personnel or by a two-way intercom, signage, or some other device. Upon entry, the subject turns 90 degrees and enters inspection lane 906. The subject traverses inspection lane 906 and walks toward camera 922 which scans his or her front for evidence of weapons, explosives, or other objects. Upon reaching the gap/door 918 in partition 914, the subject turns 90 degrees to enter the inspection lane. Gap/door 918 may be equipped with a door, gate, barrier, or other device designed to control movement from inspection lane 906 to inspection lane 918. The subject steps into inspection lane 918 and then turns 90 degrees once more and traverses the remaining length of inspection lane 918. The combined arc of these two turns positions the subject to have his or her back scanned by camera 920 for evidence of weapons, explosives, or other objects. In all cases, subjects may be commanded by security personnel orally, by optional two-way intercom, or some other device to raise their arms overhead to permit scanning and detection for concealed objects secreted under their arms. If the detection system 910 detects a possible explosive, weapon, or prohibited item, action is taken in accordance with local security procedures. If no weapons, explosives, or banned objects are detected the subject turns 90 degrees and exits inspection lane 916 via exit 912.

Figure 18:
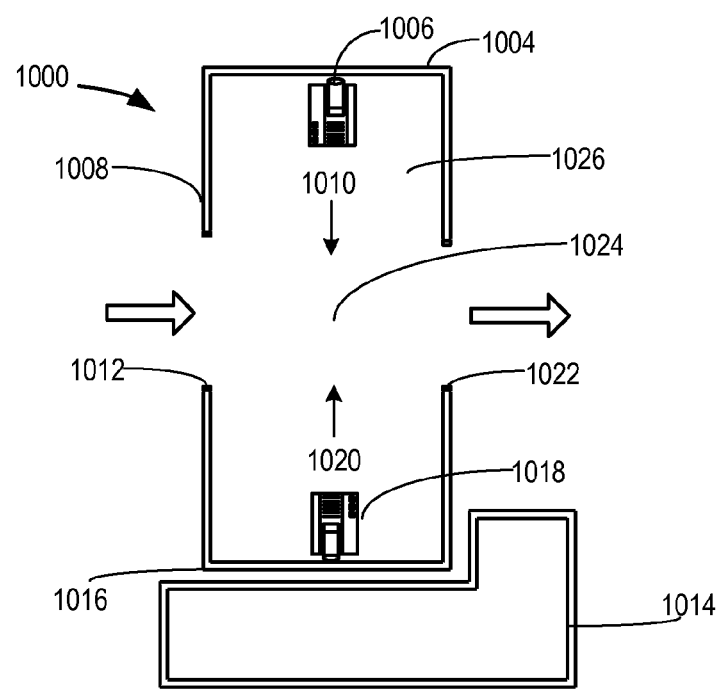
FIG. 18 is a plan view of an alternative embodiment of the structural system for optimizing performance of a millimeter wave concealed object detection system illustrating a dual-unit stop and turn portal.

Referring now to FIG. 18, a particular illustrative tenth embodiment of a system for optimizing performance of a millimeter wave concealed object detection system is disclosed. The disclosed system is based on a dual-unit stop and turn portal system designed for detection of concealed weapons, explosives, and other objects. The structural system 1000 is for use within a building, shed, or other structure and includes a concealed object or weapons detection system that can be positioned in series with the entry or exit of the parent structure, shed or structure or elsewhere as appropriate. The structural system 1000 may have a floor covering 1002 or additional add-on flooring designed to optimize performance of the millimeter wave concealed object detection system 1026 by eliminating or mitigating spurious millimeter wave emissions and/or reflections from outside or inside the parent structure, shed, or structure. The structural system 1000 will normally be deployed with walls 1004 and 1016 designed to optimize the performance of the millimeter wave concealed object detection system 1026 by eliminating or mitigating spurious millimeter wave emissions and/or reflections from outside or inside the parent structure, or shed. The general area surrounding the structural system 1000 is equipped with stanchions/walls 1008, barriers, or other devices to control access into, out of, and within the structural system 1000. Walls 1004 and 1016, and stanchions/walls 1008, may be used to provide secure access to the structural system 1000. In addition, 1004 and 1016, and stanchions/walls 1008 may be designed with blast and/or weapon resistant features including blast proof or resistant materials, and other damage mitigation features. The interior area of the structural system 1000 may be equipped with guides, rails, or barriers designed to guide the subject through the system at the required angles, turns, distances, and positions. The structural system 1000 is equipped with an entry 1012 and exit 1022 which can be open or equipped with automated turnstiles, gates, doors, magnetic locks, or other devices designed to control entry and exit from the system 1000. Entry 1012 and exit 1022 may also be designed to permit manual control of turnstiles and other security devices if installed. Subjects move through the detection system 1026 as directed by intercoms, electric signs, monitors, buzzers, or guard personnel positioned on, near, or by entry 1012 and/or exit 1022 as may be convenient or as required by the application. Closed circuit television cameras in addition to those installed in the concealed object or weapons detection system 1026 may be installed to provide security personnel with the ability to monitor subjects remotely as they wait for entry, enter, transverse, or exit from the detection system 1026. In some embodiments, control of the entry and/or exit barriers may be performed via the concealed object detection system and/or Programmable Logic Controller (PLC) for autonomous control. The structural system 1000 may be equipped with air conditioning and heating arrangements appropriate to the geographical location which will maintain an interior operating environment conducive to proper operation of the detection system 1026, and the comfort of operating personnel and subjects.

The interior of the structural system 1000 is provided with a millimeter wave concealed object detection system 1026 consisting of two cameras 1006 and 1018 which are positioned so as to provide full front and back scanning coverage when subject traverses the portal. The system 1026 provides for detection of concealed explosives, weapons, or prohibited objects. The two view lanes 1010 and 1020 provide a clear viewing lane respectively for cameras 1006 and 1018. View lanes 1010 and 1020 may be designed with materials that can optimize performance of the millimeter wave concealed object detection system 1026 by eliminating or mitigating spurious millimeter wave emissions from outside or inside the parent structure, shed, or structure. The view lanes 1010 and 1020 may be equipped with various types of wall or ceiling mounted signage and floor arrows to assist and/or guide subjects during the scanning process. A fixed or portable X-ray luggage scanner 1014, magnetometer, biometrics, or similar devices for screening luggage, personal effects, and individual subjects may be included with system 1026 depending on circumstances.

In operation, the subject enters the structural system 1000 through entry 1012 when directed to do so by security personnel or by a two-way intercom, signage, or some other device. Upon entry, the subject stops on the indicated floor marker 1024 and turns 90 degrees left or right as ordered by the security personnel operating the detection system 1026. The subject stands without moving for approximately three seconds, or until directed by security personnel while cameras 1006 and 1018 scan his or her front and back for evidence of weapons, explosives, or other objects. In all cases, subjects may be commanded by security personnel orally, by optional two-way intercom, or some other device to raise their arms overhead to permit scanning and detection for concealed objects secreted under their arms. If the detection system 1026 detects a possible explosive, weapon, or prohibited item, action is taken in accordance with local security procedures. If no weapons, explosives, or banned objects are detected the subject turns 90 degrees and exits via exit 1022. Subject picks up any luggage or personal items at the X-ray luggage scanner, if installed, and departs the area.

Figure 19:
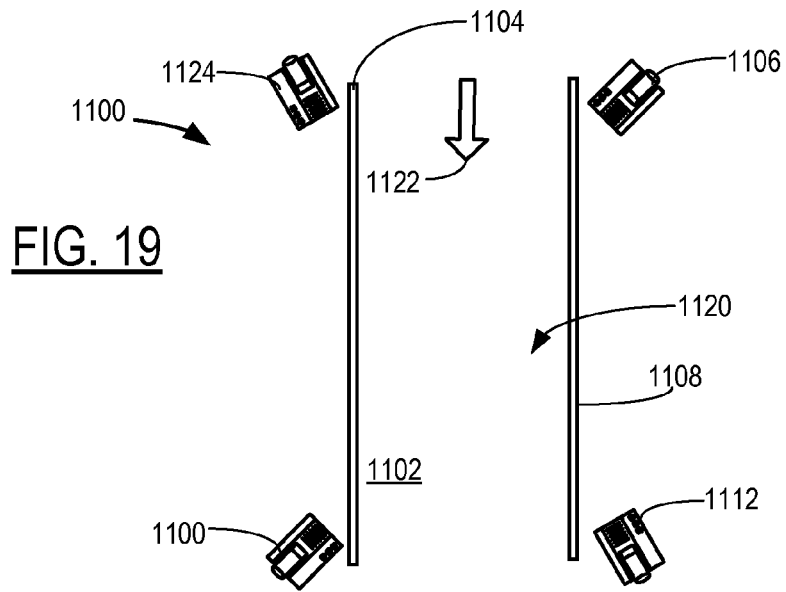
FIG. 19 is a plan view of an alternative embodiment of the structural system for optimizing performance of a millimeter wave concealed object detection system illustrating a four-unit straight-through portal.

Referring now to FIG. 19, a particular illustrative eleventh embodiment of a system for optimizing performance of a millimeter wave concealed object detection system is disclosed. The disclosed system is based on a four-unit straight through portal system designed for detection of concealed weapons, explosives, and other objects. The structural system is for use within a building, shed, or other structure and includes a concealed object or weapons detection system that can be positioned in series with the entry or exit of the parent structure, shed or structure or elsewhere as appropriate. The structural system 1100 may have a floor covering 1102 or additional add-on flooring designed to optimize performance of the millimeter wave concealed object detection system 1120 by eliminating or mitigating spurious millimeter wave emissions and/or reflections from outside or inside the parent structure, shed, or structure. The structural system 1100 will normally be deployed with side walls 1108 designed to optimize the performance of the millimeter wave concealed object detection system 1120 by eliminating or mitigating spurious millimeter wave emissions and/or reflections from outside or inside the parent structure, or shed. The general area surrounding the structural system 1100 may be equipped with stanchions/walls, barriers, or other devices to control access into, out of, and within the detection system 1120. Walls 1108 may be used to provide secure access to the structural system 1100. In addition, walls 1108 may be designed with blast and/or weapon resistant features including blast proof or resistant materials, and other damage mitigation features. The interior area of the structural system 1100 may be equipped with guides, rails, or barriers designed to guide the subject through the detection system 1120 at the required angles, turns, distances, and positions. The structural system 1100 is equipped with an entry 1104 and exit 1114 which can be open or equipped with automated turnstiles, gates, doors, magnetic locks, or other devices designed to control entry and exit from the detection system 1120. Entry 1104 and exit 1114 may also be designed to permit manual control of turnstiles and other security devices if installed. Subjects move through the detection system 1120 as directed by intercoms, electric signs, monitors, buzzers, or guard personnel positioned on, near, or by entry 1104 and/or exit 1114 as may be convenient or as required by the application. Closed circuit television cameras in addition to those installed in the concealed object or weapons detection system 1120 may be installed to provide security personnel with the ability to monitor subjects remotely as they wait for entry, enter, transverse, or exit from the detection system 1120. In some embodiments, control of the entry and/or exit barriers may be performed via the concealed object detection system and/or Programmable Logic Controller (PLC) for autonomous control. The structural system 1100 may be equipped with air conditioning and heating arrangements appropriate to the geographical location which will maintain an interior operating environment conducive to proper operation of the system, and the comfort of operating personnel and subjects.

The interior of the structural system 1100 is provided with a millimeter wave concealed object detection system 1120 consisting of four cameras 1106, 1112, 1116, and 1124 which are positioned so as to provide full front and back scanning coverage when subject traverses the portal. The system 1120 provides for detection of concealed explosives, weapons, or prohibited objects. The inspection lane 1122 provides a straight scanning lane that does not require subjects to turn or maneuver as they traverse the system. Inspection lane 1122 may be designed with materials that can optimize performance of the millimeter wave concealed object detection system by eliminating or mitigating spurious millimeter wave emissions from outside or inside the parent structure, shed, or structure. The inspection lane 1122 may be equipped with various types of wall or ceiling mounted signage and floor arrows to assist and/or guide subjects during the scanning process. The system 1120 may be equipped with laser detectors, electronic eyes, optical, timing, or triggering devices to automatically control and/or coordinate the scanning sequence of cameras 1106, 1112, 1116, and 1124. The floor 1102 of the inspection lane 1122 may be equipped with a fixed or portable moving sidewalk intended to convey subjects at a fixed or controlled rate of advance through the system. A fixed or portable X-ray luggage scanner, magnetometer, biometrics, or similar devices for screening luggage, personal effects, and individual subjects may be included with system 1120 depending on circumstances.

In operation, the subject enters the structural system 1100 through entry 1104 when directed to do so by security personnel or by a two-way intercom, signage, or some other device. Upon entry, the subject traverses the inspection lane at a normal walking pace as directed by the security personnel operating the system. An optional portable or fixed moving sidewalk may be installed to convey the subject through the inspection lane 1122 to ensure optimal scanning results, throughput, and convenience. Optional laser or other detectors 1110 and 1118 detect the subject's movement and send a digital or analog timing signal to the cameras to ensure the cameras are properly sequenced for optimal scanning results. The timing signal may also be used to sequence the movement of an optional moving sidewalk if installed. Cameras 1106 and 1124 scan the subject's back and cameras 1112 and 1116 scan the subject's front for evidence of weapons, explosives, or other objects as he or she traverses the inspection lane. In all cases, subjects may be commanded by security personnel orally, by optional two-way intercom, or some other device to raise their arms overhead to permit scanning and detection for concealed objects secreted under their arms. If the system 1120 detects a possible explosive, weapon, or prohibited object, action is taken in accordance with local security procedures. If no weapons, explosives, or banned objects are detected the subject exits via exit 1114. Subjects pick up any luggage or personal items at the X-ray luggage scanner 1114, if installed, and depart the area.

Figure 20:
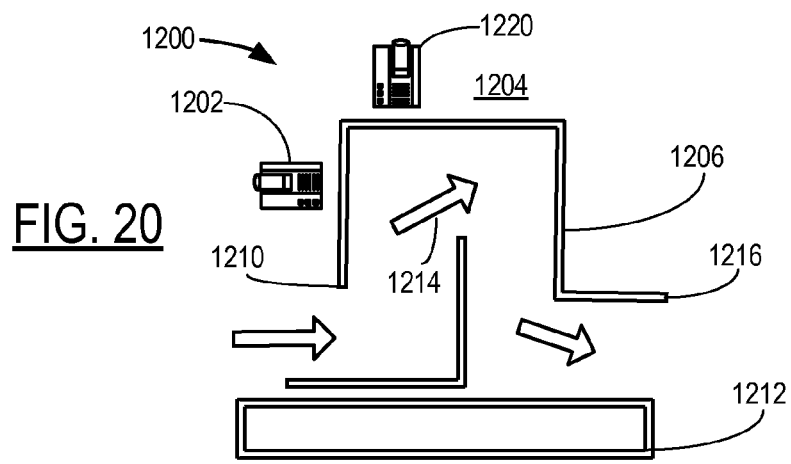
FIG. 20 is a plan view of an alternative embodiment of the structural system for optimizing performance of a millimeter wave concealed object detection system illustrating a dual-unit compact corner portal.

Referring now to FIG. 20, a particular illustrative twelfth embodiment of a system for optimizing performance of a millimeter wave concealed object detection system is disclosed. The disclosed system is based on a dual-unit compact corner portal system designed for detection of concealed weapons, explosives, and other objects. The system is designed for use within a building, shed, or other structure and includes a concealed object or weapons detection system that can be positioned in series with the entry or exit of the parent structure, shed or structure or elsewhere as appropriate. The structural system 1200 is emplaced on the floor of the parent structure, shed, or structure. It may have a floor covering 1204 or additional add-on flooring designed to optimize performance of the millimeter wave concealed object detection system by eliminating or mitigating spurious millimeter wave emissions and/or reflections from outside or inside the parent structure, shed, or structure. The structural system 1200 will normally be deployed with side walls 1206 designed to optimize the performance of the millimeter wave concealed object detection system by eliminating or mitigating spurious millimeter wave emissions and/or reflections from outside or inside the parent structure, or shed. The general area surrounding the structural system 1200 may be equipped with stanchions/walls, barriers, or other devices to control access into, out of, and within the system. Walls 1206 may be used to provide secure access to the structural system 1200. In addition, walls 1206 may be designed with blast and/or weapon resistant features including blast proof or resistant materials, and other damage mitigation features. The interior area of the structural system 1200 may be equipped with floor arrows, guides, rails, or barriers designed to guide the subject through the system at the required angles, turns, distances, and positions. The structural system 1200 is equipped with an entry 1210 and exit 1216 which can be open or equipped with automated turnstiles, gates, doors, magnetic locks, or other devices designed to control entry and exit from the system. Entry 1210 and exit 1216 may also be designed to permit manual control of turnstiles and other security devices if installed. Subjects move through the system as directed by intercoms, electric signs, monitors, buzzers, or guard personnel positioned on, near, or by entry 1210 and/or exit 1216 as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1200 may be equipped with air conditioning and heating arrangements appropriate to the geographical location which will maintain an interior operating environment conducive to proper operation of the system, and the comfort of operating personnel and subjects.

The interior of the structural system 1200 is provided with a millimeter wave concealed object detection system consisting of two cameras 1202 and 1220 which are positioned so as to provide full front and back scanning coverage when subject traverses the portal. The system provides for detection of concealed explosives, weapons, or prohibited objects. Inspection lane 1214 consists of several points where subjects must turn while traversing the system. Inspection lane 1214 may be designed with materials that can optimize performance of the millimeter wave concealed object detection system by eliminating or mitigating spurious millimeter wave emissions from outside or inside the parent structure, shed, or structure. The inspection lane 1214 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1200 through entry 1210 when directed to do so by security personnel or by a two-way intercom, signage, or some other device. The subject turns 90 degrees at the start of the inspection lane 1214 which may be marked with floor arrows. The subject traverses the inspection lane 1214 at a normal walking pace as directed by the security personnel operating the system. The subject turns 90 degrees which may be marked with floor arrows and continues traversing the inspection lane 1214. Camera 1220 scans the subject's front for evidence of weapons, explosives, or other objects. The subject turns 90 degrees which may be marked with floor arrows and continues traversing the inspection lane 1214. Camera 1202 scans the subject's back for evidence of weapons, explosives, or other objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns 90 degrees at point 1218 and exits via exit 1216. Subjects pick up any luggage or personal items at the X-ray luggage scanner 1212, if installed, and depart the area.

Figure 21:
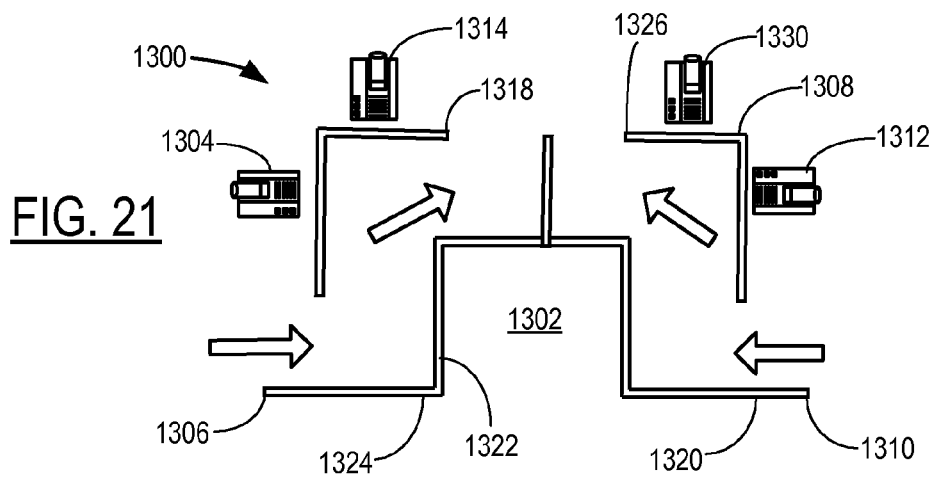
FIG. 21 is a plan view of an alternative embodiment of the structural system for optimizing performance of a millimeter wave concealed object detection system illustrating a four-unit corner portal.

Referring now to FIG. 21, a particular illustrative thirteenth embodiment of a system for optimizing performance of a millimeter wave concealed object detection system is disclosed. The disclosed system is based on a four-unit corner portal system designed for detection of concealed weapons, explosives, and other objects. The system is designed for use within a building, shed, or other structure and includes a concealed object or weapons detection system, that can be positioned in series with the entry or exit of the parent structure, shed or structure or elsewhere as appropriate. The structural system 1300 may have a floor covering 1302 or additional add-on flooring designed to optimize performance of the millimeter wave concealed object detection system by eliminating or mitigating spurious millimeter wave emissions and/or reflections from outside or inside the parent structure, shed, or structure. The structural system 1300 will normally be deployed with partitions/walls 1308 and end walls 1320 and 1324 designed to optimize the performance of the millimeter wave concealed object detection system by eliminating or mitigating spurious millimeter wave emissions and/or reflections from outside or inside the parent structure, or shed. The general area surrounding the structural system 1300 may be equipped with removable stanchions 1322, walls, barriers, or other devices to control access into, out of, and within the system. Stanchions 1322 may be repositioned to the opposite side of exits 1326 and 1318 to change the direction of flow of subjects departing the system. Partitions/walls 1308 may be used to provide secure access to the structural system 1300. In addition, walls 1308 may be designed with blast and/or weapon resistant features including blast proof or resistant materials, and other damage mitigation features. The interior area of the structural system 1300 may be equipped with floor arrows, guides, rails, or barriers designed to guide the subject through the system at the required angles, turns, distances, and positions. The structural system 1300 is equipped with entrances 1306 and 1310 which can be open or equipped with automated turnstiles, gates, doors, magnetic locks, or other devices designed to control entry and exit from the system. Entrances 1306 and 1310 may also be designed to permit manual control of turnstiles and other security devices if installed. Exits 1318 and 1326 each have two openings that permit egress from the system which can be open or equipped with automated turnstiles, gates, doors, magnetic locks, or other devices designed to control entry and exit from the system. Exits 1318 and 1326 may also be designed to permit manual control of turnstiles and other security devices if installed. Subjects move through the system as directed by intercoms, electric signs, monitors, buzzers, or guard personnel positioned on, near, or by entrances 1306 and 1310, or by exits 1318 and 1326, as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1300 may be equipped with air conditioning and heating arrangements appropriate to the geographical location which will maintain an interior operating environment conducive to proper operation of the system, and the comfort of operating personnel and subjects.

The interior of the structural system 1300 is provided with a millimeter wave concealed object detection system consisting of four cameras 1304, 1312, 1314, and 1330 which are positioned so as to provide full front and back scanning coverage when subject traverses the portal. The system provides for detection of concealed explosives, weapons, or prohibited objects. Inspection lanes 1316 and 1328 may be designed with materials that can optimize performance of the millimeter wave concealed object detection system by eliminating or mitigating spurious millimeter wave emissions from outside or inside the parent structure, shed, or structure. The inspection lanes 1316 and 1328 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1300 through one of the entrances 1306 or 1310 when directed to do so by security personnel or by a two-way intercom, signage, or some other device. The subject turns 90 degrees at the start of the inspection lanes 1316 or 1328 which may be marked with floor arrows. The subject traverses the inspection lanes 1316 or 1328 at a normal walking pace as directed by the security personnel operating the system. As the subject approaches camera 1314 or 1330, his or her front is scanned for weapons, explosives, or prohibited objects. The subject turns again 90 degrees as he or she approaches the camera 1314 or 1330. Camera 1304 or 1312 scans the subject's back for evidence of weapons, explosives, or prohibited objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns 90 degrees at exit 1318 or 1326 and exits from whichever opening or openings security personnel have left unblocked adjacent to partition/walls 1320 or 1324. The exits may be equipped with signage or other devices to direct them towards the appropriate opening. Subjects pick up any luggage or personal items at the X-ray luggage scanner, if installed, and depart the area.

Figure 22:
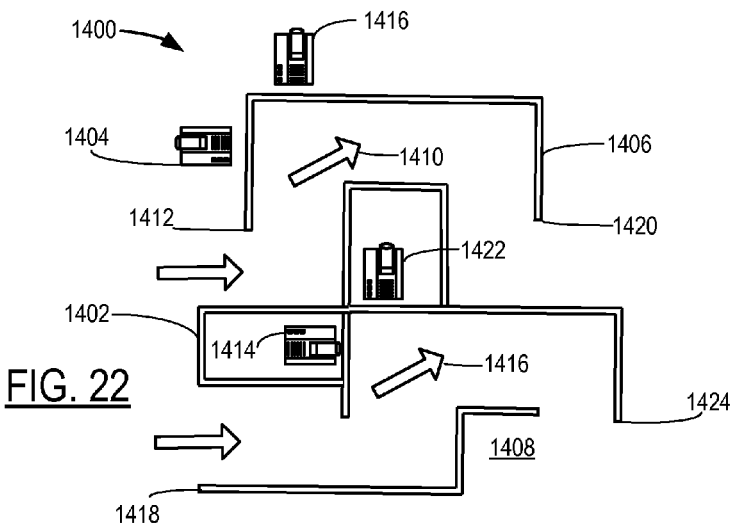
FIG. 22 is a plan view of an alternative embodiment of the structural system for optimizing performance of a millimeter wave concealed object detection system illustrating a four-unit nested corner portal.

Referring now to FIG. 22, a particular illustrative fourteenth embodiment of a system for optimizing performance of a millimeter wave concealed object detection system is disclosed. The disclosed system is based on a four-unit corner portal system designed for detection of concealed weapons, explosives, and other objects. The system is designed for use within a building, shed, or other structure and includes a concealed object or weapons detection system that can be positioned in series with the entry or exit of the parent structure, shed or structure or elsewhere as appropriate. The structural system 1400 may have a floor covering 1408 or additional add-on flooring designed to optimize performance of the millimeter wave concealed object detection system by eliminating or mitigating spurious millimeter wave emissions and/or reflections from outside or inside the parent structure, shed, or structure. The structural system 1400 will normally be deployed with partitions/walls 1406 designed to optimize the performance of the millimeter wave concealed object detection system by eliminating or mitigating spurious millimeter wave emissions and/or reflections from outside or inside the parent structure, or shed. The general area surrounding the structural system 1400 may be equipped with removable stanchions, walls, barriers, or other devices to control access into, out of, and within the system. In addition, walls 1406 may be designed with blast and/or weapon resistant features including blast proof or resistant materials, and other damage mitigation features. The interior area of the structural system 1400 may be equipped with floor arrows, guides, rails, or barriers designed to guide the subject through the system at the required angles, turns, distances, and positions. The structural system 1400 is equipped with entrances 1412 and 1418 which can be open or equipped with automated turnstiles, gates, doors, magnetic locks, or other devices designed to control entry and exit from the system. Entrances 1412 and 1418 may also be designed to permit manual control of turnstiles and other security devices if installed. Exits 1420 and 1424 can be open or equipped with automated turnstiles, gates, doors, magnetic locks, or other devices designed to control entry and exit from the system. Exits 1420 and 1424 may also be designed to permit manual control of turnstiles and other security devices if installed. Subjects move through the system as directed by intercoms, electric signs, monitors, buzzers, or guard personnel positioned on, near, or by entrances 1412 and 1418, or by exits 1420 and 1424, as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1300 may be equipped with air conditioning and heating arrangements appropriate to the geographical location which will maintain an interior operating environment conducive to proper operation of the system, and the comfort of operating personnel and subjects.

The interior of the structural system 1400 is provided with a millimeter wave concealed object detection system consisting of four cameras 1404, 1414, 1422, and 1426 which are positioned so as to provide full front and back scanning coverage when subject traverses the portal. Each camera is protected by a walled enclosure of which 1402 is a typical example. The system provides for detection of concealed explosives, weapons, or prohibited objects. Inspection lanes 1410 and 1416 which may be designed with materials that can optimize performance of the millimeter wave concealed object detection system by eliminating or mitigating spurious millimeter wave emissions from outside or inside the parent structure, shed, or structure. The inspection lanes 1410 and 1416 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1400 through one of the entrances 1412 or 1418 when directed to do so by security personnel or by a two-way intercom, signage, or some other device. The subject turns 90 degrees at the start of the inspection lanes 1410 or 1416 which may be marked with floor arrows. The subject traverses the inspection lanes 1410 or 1416 at a normal walking pace as directed by the security personnel operating the system. As the subject walks toward camera 1426 or 1422, his or her front is scanned for weapons, explosives, or prohibited objects. The subject turns again 90 degrees as he or she approaches the camera 1426 or 1422. Camera 1404 or 1414 scans the subject's back for evidence of weapons, explosives, or prohibited objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns 90 degrees at exit 1420 or 1420 and exits. The exits may be equipped with signage or other devices to direct them towards the appropriate opening. Subjects pick up any luggage or personal items at the X-ray luggage scanner, if installed, and depart the area.

Figure 23:
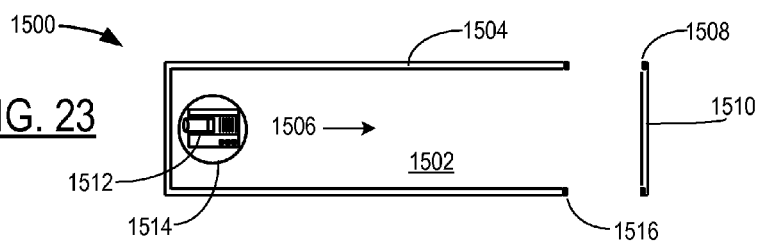
FIG. 23 is a plan view of an alternative embodiment of the structural system for optimizing performance of a millimeter wave concealed object detection system illustrating a single-unit low volume system.

Referring now to FIG. 23, a particular illustrative fifteenth embodiment of a system for optimizing performance of a millimeter wave concealed object detection system is disclosed. The disclosed system is based on a single-unit low volume system designed for detection of concealed weapons, explosives, and other objects. The system is designed for use within a building, shed, or other structure and includes a concealed object or weapons detection system that can be positioned in series with the entry or exit of the parent structure, shed or structure or elsewhere as appropriate. The structural system 1500 is emplaced on the floor of the parent structure, shed, or structure. It may have a floor covering 1502 or additional add-on flooring designed to optimize performance of the millimeter wave concealed object detection system by eliminating or mitigating spurious millimeter wave emissions and/or reflections from outside or inside the parent structure, shed, or structure. The structural system 1500 will normally be deployed with partitions/walls 1504 designed to optimize the performance of the millimeter wave concealed object detection system by eliminating or mitigating spurious millimeter wave emissions and/or reflections from outside or inside the parent structure, or shed. Wall 1510 is designed to eliminate or mitigate spurious millimeter wave emissions and/or reflections from outside or inside the parent structure, or shed. The general area surrounding the structural system 1500 may be equipped with removable stanchions, walls, barriers, or other devices to control access into, out of, and within the system. In addition, partitions/walls 1504 and wall 1510 may be designed with blast and/or weapon resistant features including blast proof or resistant materials, and other damage mitigation features. The interior area of the structural system 1500 may be equipped with floor arrows, guides, rails, or barriers designed to guide the subject through the system at the required angles, turns, distances, and positions. The structural system 1500 is equipped with entry 1508 and exit 1516 which can be open or equipped with automated turnstiles, gates, doors, magnetic locks, or other devices designed to control entry and exit from the system. Entry 1508 may also be designed to permit manual control of turnstiles and other security devices if installed. Exit 1516 can be open or equipped with automated turnstiles, gates, doors, magnetic locks, or other devices designed to control entry and exit from the system. Exit 1516 may also be designed to permit manual control of turnstiles and other security devices if installed. Subjects move through the system as directed by intercoms, electric signs, monitors, buzzers, or guard personnel positioned on, near, or by entry 1508, or by exit 1516, as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1500 may be equipped with air conditioning and heating arrangements appropriate to the geographical location which will maintain an interior operating environment conducive to proper operation of the system, and the comfort of operating personnel and subjects.

The interior of the structural system 1500 is provided with a millimeter wave concealed object detection system consisting of one camera 1512 which is positioned so as to provide full front and back scanning coverage when subject traverses the portal and rotates 360 degrees. The camera is mounted on a Brijot Mobile Stand 1514 or similar device. The system provides for detection of concealed explosives, weapons, or prohibited objects. Inspection lanes 1506 may be designed with materials that can optimize performance of the millimeter wave concealed object detection system by eliminating or mitigating spurious millimeter wave emissions from outside or inside the parent structure, shed, or structure. The inspection lane 1506 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1500 through entry 1508 when directed to do so by security personnel or by a two-way intercom, signage, or some other device. The subject turns 360 degrees directed by the security personnel operating the system. As the subject rotates, the camera 1512 scans his or her front, back and sides for weapons, explosives, or prohibited objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns toward exit 1516 and exits. The entry and exit may be equipped with signage or other devices to direct them towards the appropriate opening. Subjects pick up any luggage or personal items at the X-ray luggage scanner, if installed, and depart the area.

Figure 24:
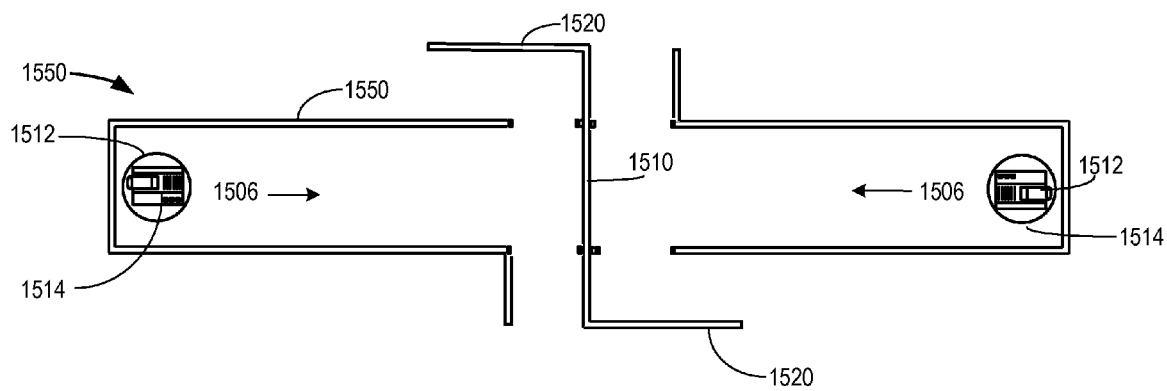
FIG. 24 is a plan view of an alternative embodiment of the structural system for optimizing performance of a millimeter wave concealed object detection system illustrating a double-ended high volume portal.

Referring now to FIG. 24, the structural system 1550 includes two systems that can be combined to form a double-ended high volume portal. The combined systems share a common wall 1510 which may be designed with materials that can optimize performance of the millimeter wave concealed object detection system by eliminating or mitigating spurious millimeter wave emissions from outside or inside the parent structure, shed, or structure. All of the details of the combined system are otherwise identical to those for the fourteenth embodiment with the exception that the ingress and egress of subjects to and from the portal may be adjusted as required or as convenient through the use of adjustable stanchions and/or partitions 1520.

Figure 25:
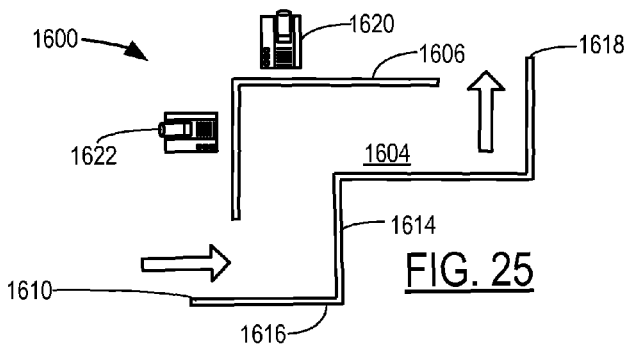
FIG. 25 is a plan view of an alternative embodiment of the structural system for optimizing performance of a millimeter wave concealed object detection system illustrating a dual-unit corner portal.

Referring now to FIG. 25, a particular illustrative sixteenth embodiment of a system for optimizing performance of a millimeter wave concealed object detection system is disclosed. The disclosed system is based on a dual-unit corner portal with a modified inspection lane 1608 designed for detection of concealed weapons, explosives, and other objects. The system is designed for use within a building, shed, or other structure and includes a concealed object or weapons detection system, that can be positioned in series with the entry or exit of the parent structure, shed or structure or elsewhere as appropriate. The structural system 1600 may have a floor covering 1604 or additional add-on flooring designed to optimize performance of the millimeter wave concealed object detection system by eliminating or mitigating spurious millimeter wave emissions and/or reflections from outside or inside the parent structure, shed, or structure. The structural system 1600 will normally be deployed with partitions/walls 1606 and end wall 1616 designed to optimize the performance of the millimeter wave concealed object detection system by eliminating or mitigating spurious millimeter wave emissions and/or reflections from outside or inside the parent structure, or shed. The general area surrounding the structural system 1600 may be equipped with removable stanchions 1614, walls, barriers, or other devices to control access into, out of, and within the system. Stanchions 1614 may be repositioned to the opposite side of exits 1618 to change the direction of flow of subjects departing the system. Partitions/walls 1618 may be used to provide secure access to the structural system 1600. In addition, walls/partitions 1606 and wall 1616 may be designed with blast and/or weapon resistant features including blast proof or resistant materials, and other damage mitigation features. The interior area of the structural system 1600 may be equipped with floor arrows, guides, rails, or barriers designed to guide the subject through the system at the required angles, turns, distances, and positions. The structural system 1600 is equipped with entry 1610 which can be open or equipped with automated turnstiles, gates, doors, magnetic locks, or other devices designed to control entry and exit from the system. Entry 1610 may also be designed to permit manual control of turnstiles and other security devices if installed. By removing stanchions 1614, exit 1618 has two openings that permit egress from the system and which can be open or equipped with automated turnstiles, gates, doors, magnetic locks, or other devices designed to control entry and exit from the system. Exit 1618 may also be designed to permit manual control of turnstiles and other security devices if installed. Subjects move through the system as directed by intercoms, electric signs, monitors, buzzers, or guard personnel positioned on, near, or by entry 1610 or by exit 1618, as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1600 may be equipped with air conditioning and heating arrangements appropriate to the geographical location which will maintain an interior operating environment conducive to proper operation of the system, and the comfort of operating personnel and subjects.

The interior of the structural system 1600 is provided with a millimeter wave concealed object detection system consisting of two cameras 1620 and 1622 which are positioned so as to provide full front and back scanning coverage when subject traverses the portal. Each camera is protected by a walled enclosure of which 1302 is a typical example. The system provides for detection of concealed explosives, weapons, or prohibited objects. Inspection lane 1608 may be designed with materials that can optimize performance of the millimeter wave concealed object detection system by eliminating or mitigating spurious millimeter wave emissions from outside or inside the parent structure, shed, or structure. The inspection lane 1608 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1600 through entry 1610 when directed to do so by security personnel or by a two-way intercom, signage, or some other device. The subject turns 90 degrees at the start of the inspection lane 1608 which may be marked with floor arrows. The subject traverses the inspection lane 1608 at a normal walking pace as directed by the security personnel operating the system. As the subject approaches camera 1620, his or her front is scanned for weapons, explosives, or prohibited objects. The subject turns again 90 degrees as he or she approaches camera

1620. Camera 1622 scans the subject's back for evidence of weapons, explosives, or prohibited objects. Point 1612 may be marked with arrows, floor markings, or signage. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns 90 degrees at exit 1618 and exits from whichever opening or openings security personnel have left unblocked adjacent to wall 1616. The exits may be equipped with signage or other devices to direct them towards the appropriate opening. Subjects pick up any luggage or personal items at the X-ray luggage scanner, if installed, and depart the area.

Figure 26:
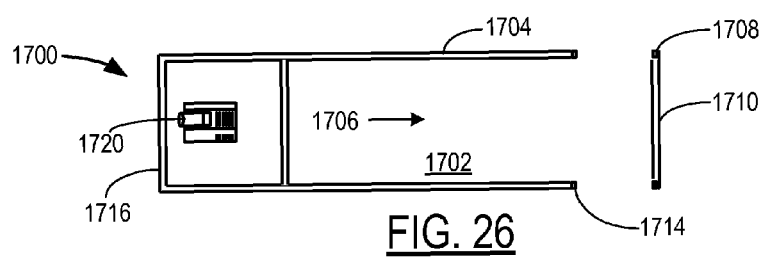
FIG. 26 is a plan view of an alternative embodiment of the structural system for optimizing performance of a millimeter wave concealed object detection system illustrating a single-unit system.

Referring now to FIGS. 26 and 27, a particular illustrative seventeenth embodiment of a system for optimizing performance of a millimeter wave concealed object detection system is disclosed. The disclosed system is based on a single-unit system designed for detection of concealed weapons, explosives, and other objects. The system is designed for use within a building, shed, or other structure and includes a concealed object or weapons detection system, that can be positioned in series with the entry or exit of the parent structure, shed or structure or elsewhere as appropriate. The structural system 1700 is emplaced on the floor of the parent structure, shed, or structure. Two or more units 1722 and 1724 may be positioned adjacent or in close proximity to each other in order to increase overall throughput of subjects traversing the system. It may have a floor covering 1702 or additional add-on flooring designed to optimize performance of the millimeter wave concealed object detection system by eliminating or mitigating spurious millimeter wave emissions and/or reflections from outside or inside the parent structure, shed, or structure. The camera 1720 of the structural system 1700 will normally be attached or otherwise affixed to a building wall 1716 or supporting structure by means of a wall mounting unit. A portable wall or mobile stand may be used in lieu of wall 1716 if no appropriate fixed structure is available. Wall/partition 1710 is designed to optimize the performance of the millimeter wave concealed object detection system by eliminating or mitigating spurious millimeter wave emissions and/or reflections from outside or inside the parent structure, or shed. The general area surrounding the structural system 1700 is equipped with stanchions 1704, barriers, or other devices to control access into, out of, and within the system. Wall/partition 1710 and 1716, and stanchions/barriers 1704, may be used to provide secure access to the structural system 1700. In addition, wall/partition 1710 and 1716, and stanchions/barriers 1704, may be designed with blast and/or weapon resistant features including blast proof or resistant materials, and other damage mitigation features. The interior area of the structural system 1700 may be equipped with guides, rails, or barriers designed to guide the subject through the system at the required angles, turns, distances, and positions. The structural system 1700 is equipped with an entry 1708 and exit 1714 which can be open or equipped with automated turnstiles, gates, doors, magnetic locks, or other devices designed to control entry and exit from the system. Entry 1708 and exit 1714 may also be designed to permit manual control of turnstiles and other security devices if installed. Subjects move through the system as directed by intercoms, electric signs, monitors, buzzers, or guard personnel positioned on, near, or by entry 1708 and/or exit 1714 as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1700 may be equipped with air conditioning and heating arrangements appropriate to the geographical location which will maintain an interior operating environment conducive to proper operation of the system, and the comfort of operating personnel and subjects.

The interior of the structural system 1700 is provided with a millimeter wave concealed object detection system consisting of one camera 1720 positioned so as to provide full front and back scanning coverage when subject enters the system and turns 360 degrees. The system provides for detection of concealed explosives, weapons, or prohibited objects. View lane 1706 provides a clear viewing lane for camera 1720 and may be designed with materials that can optimize performance of the millimeter wave concealed object detection system by eliminating or mitigating spurious millimeter wave emissions from outside or inside the parent structure, shed, or structure. View lane 1706 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with the system depending on circumstances.

In operation, the subject enters the structural system 1700 through entry 1708 when directed to do so by security personnel or by a two-way intercom, signage, or some other device. Upon entry, the subject stops on the indicated floor marker and slowly turns 360 degrees as ordered by the security personnel operating the system. If necessary, the subject stands without moving for approximately three seconds, or until directed by security personnel while camera 1720 scans his or her front and back for evidence of weapons, explosives, or other objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject exits via exit 1714. Subject picks up any luggage or personal items at the X-ray luggage scanner, if installed, and departs the area.

Referring now to FIG. 28, a particular illustrative eighteenth embodiment of a system for optimizing performance of a millimeter wave concealed object detection system is disclosed. The disclosed system is based on a dual-unit open system with angled cameras designed for detection of concealed weapons, explosives, and other objects. The system is designed for use within a building, shed, or other structure and includes a concealed object or weapons detection system that can be positioned in series with the entry or exit of the parent structure, shed or structure or elsewhere as appropriate. The system may also be deployed as a stand-alone system within a suitable existing room or other interior space so that no additional walls or partitions may be required for successful operation. The structural system 1800 is emplaced on the floor of the parent structure, shed, or structure. It may have a floor covering 1802 or additional add-on flooring designed to optimize performance of the millimeter wave concealed object detection system by eliminating or mitigating spurious millimeter wave emissions and/or reflections from outside or inside the parent structure, shed, or structure. The structural system 1800 may be deployed with partitions/walls. A suitable structural/portable wall or barrier 1804 is required for successful operation and may be designed to optimize the performance of the millimeter wave concealed object detection system by eliminating or mitigating spurious millimeter wave emissions and/or reflections from outside or inside the parent structure, or shed. The general area surrounding the structural system 1800 may be equipped with removable stanchions, walls, barriers, or other devices to control access into, out of, and within the system. In addition, walls/barriers 1804 and other walls as typified by wall 1808 may be designed with blast and/or weapon resistant features including blast proof or resistant materials, and other damage mitigation features. The interior area of the structural system 1800 may be equipped with floor arrows, guides, rails, or barriers designed to guide the subject through the system at the required angles, turns, distances, and positions. The structural system 1800 may be an open access unit without an integrated entrance or exit. If entry 1820 and exit 1816 are provided, they may be equipped with automated turnstiles, gates, doors, magnetic locks, or other devices designed to control entry and exit from the system. Entry 1820 and exit 1816 may also be designed to permit manual control of turnstiles and other security devices if installed. Subjects move through the system as directed by intercoms, electric signs, monitors, buzzers, or guard personnel positioned on, near, or by entry 1820 and exit 1816, or elsewhere as may be convenient or as required by the application. Closed circuit television cameras in addition to those installed in the concealed object or weapons detection system may be installed to provide security personnel with the ability to monitor subjects remotely as they wait for entry, enter, transverse, or exit from the system. In some embodiments, control of the entry and/or exit barriers may be performed via the concealed object detection system and/or Programmable Logic Controller (PLC) for autonomous control. The structural system 1800 may be equipped with air conditioning and heating arrangements appropriate to the geographical location which will maintain an interior operating environment conducive to proper operation of the system, and the comfort of operating personnel and subjects.

The interior of the structural system 1800 is provided with a millimeter wave concealed object detection system consisting of two cameras which are positioned so as to provide full front and back scanning coverage when subject traverses the system and rotates 360 degrees. The cameras are mounted on a Brijot Mobile Stand or similar device. The system provides for detection of concealed explosives, weapons, or prohibited objects. Inspection are 1806 may be designed with materials that can optimize performance of the millimeter wave concealed object detection system by eliminating or mitigating spurious millimeter wave emissions from outside or inside the parent structure, shed, or structure. The inspection area 1806 may be equipped with various types of wall or ceiling mounted signage and floor arrows to assist and/or guide subjects during the scanning process. A fixed or portable X-ray luggage scanner, magnetometer, biometrics, or similar devices for screening luggage, personal effects, and individual subjects may be included with system depending on circumstances.

In operation, the subject enters the structural system 1800 through entry 1820 or via some open area when directed to do so by security personnel or by a two-way intercom, signage, or some other device. The subject stands at a designated scanning point, which may be indicated by arrows, floor markings, or signage. The subject turns 360 degrees as directed by the security personnel operating the system. As the subject rotates, cameras 1810 and 1814 scan his or her front, back and sides for evidence of weapons, explosives, or prohibited objects. In all cases, subjects may be commanded by security personnel orally, by optional two-way intercom, or some other device to raise their arms overhead to permit scanning and detection for concealed objects secreted under their arms. If the system detects a possible explosive, weapon, or prohibited item, action is taken in accordance with local security procedures. If no weapons, explosives, or banned objects are detected the subject turns toward exit 1816 or other open area and exits. The entry and exit may be equipped with signage or other devices to direct them towards the appropriate opening. Subjects pick up any luggage or personal items at the X-ray luggage scanner, if installed, and depart the area.

The previous description of the disclosed embodiments is provided to enable any person skilled in the art to make or use the disclosed embodiments. Various modifications to these embodiments are readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A structural system for optimizing performance of a millimeter wave concealed object detection system, the system comprising:
   a shell having an internal surface adapted to absorb millimeter wave emissions;
   a millimeter wave concealed object detection system housed within the shell, wherein the millimeter wave concealed object detection system adapted to detect concealed objects;
   at least one millimeter wave camera disposed in front of a first wall partition at a first end of an inspection lane within the shell; and
   a first stationary scanning area at a second end of the inspection lane;
   a controlled entry point having an entry barrier for controlling passage into the shell; and
   a controlled exit point having an exit barrier for controlling passage out of the shell.

2. The shell of claim 1, wherein the shell is free standing and the controlled exit point of the shell is connected to a parent structure entry point or parent structure exit point.

3. The system of claim 1, wherein the shell having a common-wall with a parent structure.

4. A structural system for optimizing performance of a millimeter wave concealed object detection system, the system comprising:
   a millimeter wave concealed object detection system adapted to detect concealed objects;
   a detection area formed within a perimeter of the millimeter wave concealed object detection system;
   an inspection lane for a subject to traverse when being scanned by the millimeter wave concealed object detection system;
   a first millimeter wave camera disposed along a first outside edge of the inspection lane and a second millimeter wave camera disposed perpendicular to the first millimeter wave camera and along a second outside edge of the inspection lane;
   an entry point for controlling passage into the inspection lane; and an exit point for controlling passage out of the inspection lane.

5. The system of claim 4, wherein the millimeter wave concealed object detection system further comprising:
- the inspection lane having a flow path in front of the first and second millimeter wave cameras;
- a third millimeter wave camera disposed along a third outside edge of a second inspection lane, wherein the inspection lane and the second inspection lane are symmetrical and adjacent to each other;
- a fourth millimeter wave camera disposed perpendicular to the third millimeter wave camera and along a fourth outside edge of the second inspection lane; and
- the second inspection lane having a flow path in front of the third and fourth millimeter wave cameras.

6. A structural system for optimizing performance of a millimeter wave concealed object detection system, the system comprising:
- a millimeter wave concealed object detection system adapted to detect concealed objects;
- a detection area formed within a perimeter of the millimeter wave concealed object detection system;
- an inspection lane for a subject to traverse when being scanned by the millimeter wave concealed object detection system;
- an entry point for controlling passage into the inspection lane;
- an exit point for controlling passage out of the inspection lane;
- at least one millimeter wave camera disposed in front of a first wall partition at a first end of the inspection lane; and
- a first stationary scanning area at a second end of the first inspection lane.

7. The system of claim 6, wherein the millimeter wave concealed object detection system further comprising:
- at least one millimeter wave camera disposed behind a second wall partition at the second end of the first inspection lane;
- a second stationary scanning area at a first end of the a second inspection lane; and
- a second wall partition behind the second stationary scanning area.

8. The system of claim 6 further comprising:
- at least two millimeter wave cameras, wherein each millimeter wave camera focused on the stationary scanning area from a different angle; and
- wherein the inspection lane is substantially similar in size to the detection area.

9. The system of claim 6, wherein the millimeter wave concealed object detection system further comprising:
- at least four millimeter wave cameras equidistantly disposed about the detection area wherein the inspection lane disposed diagonally with an offset through the detection area.

10. The system of claim 6, wherein the entry and exit points each further comprising automatically locking turnstiles.

11. The system of claim 6, wherein the at least one millimeter wave camera is disposed about the detection area to scan the subject when rotating in place; and the inspection lane is formed by a pair of substantially parallel interior walls.

12. The system of claim 6, wherein the inspection lane is disposed along a perimeter wall of the detection area.

13. The system of claim 6, wherein the millimeter wave concealed object detection system further comprising:
- a first and second millimeter wave camera orientated in the same direction within the detection area, wherein the first millimeter wave camera orientated to scan a first portion of the subject and the second millimeter wave camera orientated to scan a second portion of the subject.

14. The system of claim 6, wherein the inspection lane having a stationary scanning area for the subject to stand and rotate in place when being scanned by at least two millimeter wave cameras.

15. The system of claim 6, wherein the millimeter wave concealed object detection system further comprising:
- at least four millimeter wave cameras, wherein two millimeter wave cameras are disposed along a first outside edge of the inspection lane and two millimeter wave cameras are disposed along a second outside edge of the inspection lane; and
- the inspection lane disposed straight through the detection area.

16. The system of claim 6, wherein the inspection lane having a U-shaped flow path through the detection area.

17. The system of claim 6, wherein the millimeter wave concealed object detection system further comprising:
- the inspection lane having a flow path in front of first and second millimeter wave cameras;
- a third millimeter wave camera disposed along a third outside edge of a second inspection lane, wherein the inspection lane and the second inspection lane are symmetrical and adjacent to each other;
- a fourth millimeter wave camera disposed perpendicular to the third millimeter wave camera and along a fourth outside edge of the second inspection lane; and
- a second inspection lane having a flow path in front of the third and fourth millimeter wave cameras.

18. The system of claim 6, wherein the millimeter wave concealed object detection system further comprising:
- the at least one millimeter wave camera disposed at a closed end of the inspection lane; and
- a stationary scanning area at an open end of the inspection lane for the subject to stand and rotate in place when being scanned by the at least one millimeter wave camera.

19. The system of claim 6, wherein the millimeter wave concealed object detection system further comprising:
- a second millimeter wave camera disposed at a closed end of a second inspection lane;
- a stationary scanning area at an open end of the second inspection lane for the subject to stand and rotate in place when being scanned by the second millimeter wave camera; and
- wherein the inspection lane and the second inspection lane share a common wall at the respective open ends.

20. The system of claim 6, wherein the inspection lane having a corner-shaped flow path through the detection area.

* * * * *